(12) United States Patent
Schimmels

(10) Patent No.: US 7,278,345 B2
(45) Date of Patent: Oct. 9, 2007

(54) BLIND TRIMMING APPARATUS

(75) Inventor: William J. Schimmels, Oconomowoc, WI (US)

(73) Assignee: Springs Window Fashions, LLC, Middleton, WI (US)

( * ) Notice: Subject to any disclaimer, the term of this patent is extended or adjusted under 35 U.S.C. 154(b) by 219 days.

(21) Appl. No.: 11/000,661

(22) Filed: Dec. 1, 2004

(65) Prior Publication Data

US 2005/0072283 A1 Apr. 7, 2005

Related U.S. Application Data

(63) Continuation-in-part of application No. 10/610,686, filed on Jul. 1, 2003, now abandoned.

(51) Int. Cl.
*B26D 1/04* (2006.01)
*B23D 23/00* (2006.01)

(52) U.S. Cl. ............... 83/622; 83/613; 29/24.5

(58) Field of Classification Search ............ 83/633, 83/197, 451, 455, 453, 566, 628, 519, 622, 83/198, 613, 694; 144/4.9; 29/24.5
See application file for complete search history.

(56) References Cited

U.S. PATENT DOCUMENTS

| 2,793,661 A | 5/1957 | Olson |
|---|---|---|
| 3,865,430 A | 2/1975 | Tanus |
| 3,870,297 A | 3/1975 | Elder |
| 3,923,300 A | 12/1975 | Tanus |
| 4,232,900 A | 11/1980 | Parker |
| 4,245,149 A | 1/1981 | Fairlie |
| 4,653,564 A | 3/1987 | Marocco |
| 4,711,477 A | 12/1987 | Fann et al. |
| 4,767,140 A | 8/1988 | Lin |
| 4,819,530 A | 4/1989 | Huang |
| 4,945,970 A | 8/1990 | Marocco |
| 4,993,131 A | 2/1991 | Graves et al. |
| 5,163,340 A | 11/1992 | Bender |
| 5,228,077 A | 7/1993 | Darbee |
| 5,339,716 A | 8/1994 | Sands et al. |
| 5,410,326 A | 4/1995 | Goldstein |
| 5,595,769 A * | 1/1997 | Castner et al. ............ 425/183 |

(Continued)

FOREIGN PATENT DOCUMENTS

CA 1262089 10/1989

(Continued)

*Primary Examiner*—Kenneth E. Peterson
*Assistant Examiner*—Phong Nguyen
(74) *Attorney, Agent, or Firm*—Taylor & Austc, P.C.

(57) ABSTRACT

The present invention generally provides a blind trimming apparatus including a frame supporting a cutting tool, the cutting tool including a cutting edge, a blade holder supported on the frame for movement with respect to the cutting tool along a cutting path, and a blade insert including a cutting edge and being connectable to the blade holder for movement with the blade holder with respect to the cutting tool to trim blinds between the cutting edge of the cutting tool and the cutting edge of the blade insert. One of the blade holder and the blade insert defines a locating recess and the other of the blade holder and the blade insert includes a locating protrusion, which is engageable in the locating recess to align the blade insert with respect to the blade holder.

27 Claims, 25 Drawing Sheets

U.S. PATENT DOCUMENTS

| | | |
|---|---|---|
| 5,699,637 A | 12/1997 | Marocco |
| 5,710,605 A | 1/1998 | Nelson |
| 5,806,394 A | 9/1998 | Marocco |
| 5,816,126 A | 10/1998 | Pluber |
| 5,820,152 A | 10/1998 | Warren-Pfaeffle et al. |
| 5,839,784 A | 11/1998 | Breen |
| 5,897,109 A | 4/1999 | Lin |
| 5,921,028 A | 7/1999 | Marocco |
| 5,930,846 A | 8/1999 | Warren-Pfaeffle et al. |
| 5,954,021 A | 9/1999 | Yuunaga |
| 5,963,624 A | 10/1999 | Pope |
| 6,012,622 A | 1/2000 | Weinger et al. |
| 6,041,547 A | 3/2000 | Marocco |
| 6,089,134 A | 7/2000 | Marocco |
| 6,099,212 A | 8/2000 | Marocco |
| 6,167,789 B1 | 1/2001 | Daniels et al. |
| 6,178,857 B1 | 1/2001 | Marocco |
| 6,179,192 B1 | 1/2001 | Weinger et al. |
| 6,196,099 B1 | 3/2001 | Marocco |
| 6,290,661 B1 | 9/2001 | Cutler et al. |
| 6,314,851 B1 | 11/2001 | Graves et al. |
| 6,334,379 B1 | 1/2002 | Sudano |
| 6,336,388 B1 | 1/2002 | Marocco |
| 6,357,534 B1 | 3/2002 | Buetow et al. |
| 6,376,942 B1 | 4/2002 | Burger et al. |
| 6,430,358 B1 | 8/2002 | Yuen et al. |
| 6,430,359 B1 | 8/2002 | Yuen et al. |
| 6,435,066 B1 | 8/2002 | Kutchmarek et al. |
| 6,568,089 B1 | 5/2003 | Popik et al. |
| 6,688,204 B2 | 2/2004 | Huang |
| 2001/0017073 A1 | 8/2001 | Marocco |
| 2001/0039868 A1 | 11/2001 | Graves et al. |
| 2001/0054338 A1 | 12/2001 | Marocco |
| 2002/0029674 A1 | 3/2002 | Graves et al. |
| 2002/0062723 A1 | 5/2002 | Marocco |
| 2002/0163465 A1 | 11/2002 | Steinbuch |
| 2003/0015074 A1 | 1/2003 | Roberts et al. |
| 2003/0024359 A1 | 2/2003 | Roberts et al. |
| 2003/0033919 A1 | 2/2003 | Lin et al. |
| 2003/0070515 A1 | 4/2003 | Huang et al. |
| 2004/0065182 A1 | 4/2004 | Lin |

FOREIGN PATENT DOCUMENTS

| | | |
|---|---|---|
| CA | 2035971 | 8/1991 |
| CA | 1293181 | 12/1991 |
| CA | 1302229 | 6/1992 |
| CA | 2108030 | 10/1992 |
| CA | 2063632 | 9/1993 |
| CA | 2271570 | 11/1999 |
| CA | 2310340 | 7/2000 |
| CA | 2297642 | 8/2000 |
| CA | 2312533 | 12/2000 |
| CA | 2174800 | 8/2003 |
| EP | 0166625 | 1/1986 |
| EP | 0331273 | 9/1989 |
| EP | 0331330 | 9/1989 |
| WO | WO92/17676 | 10/1992 |
| WO | WO96/07727 | 3/1996 |
| WO | WO96/27727 | 9/1996 |
| WO | WO97/10407 | 3/1997 |
| WO | WO 01/07747 | 2/2001 |

\* cited by examiner

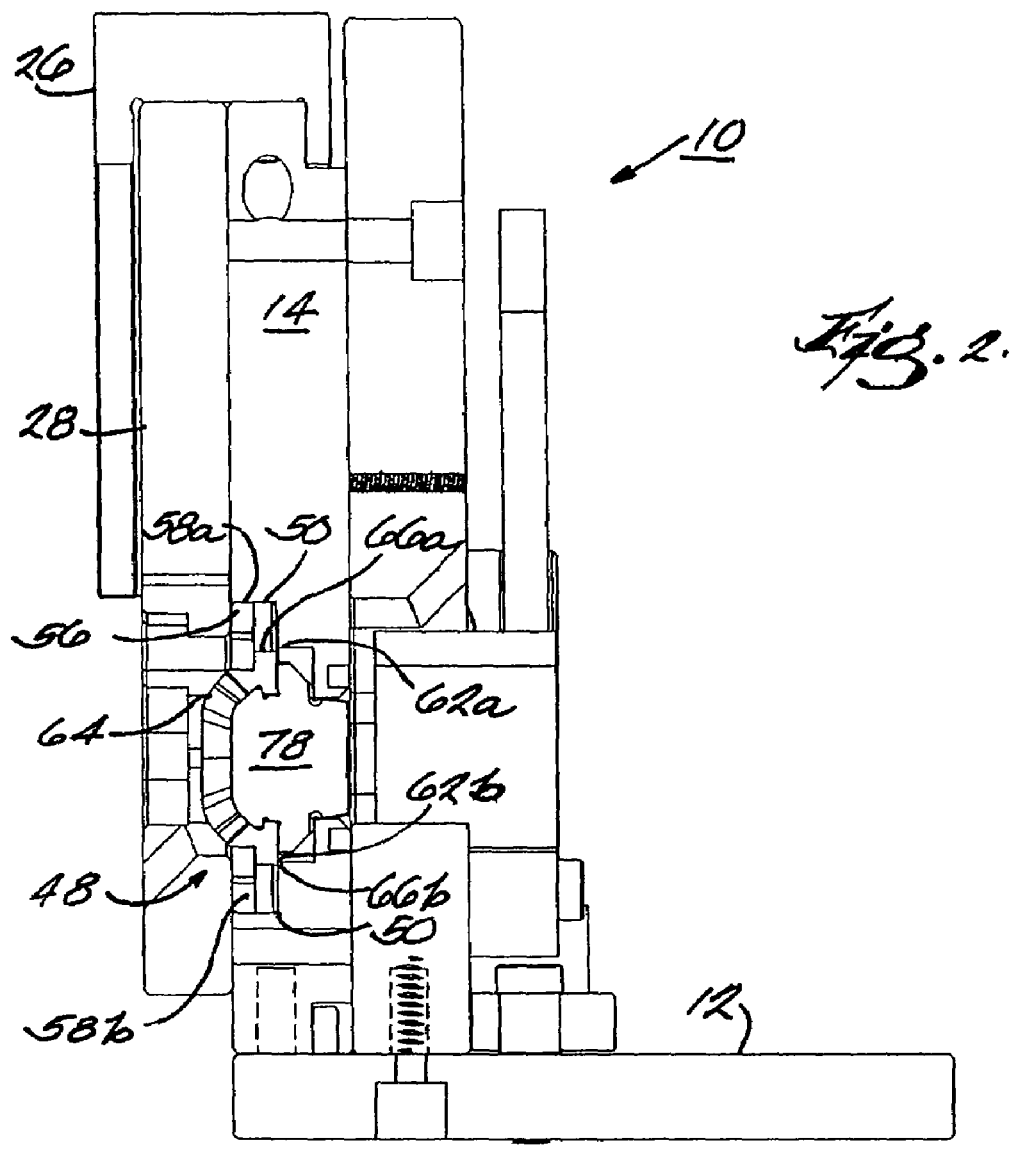

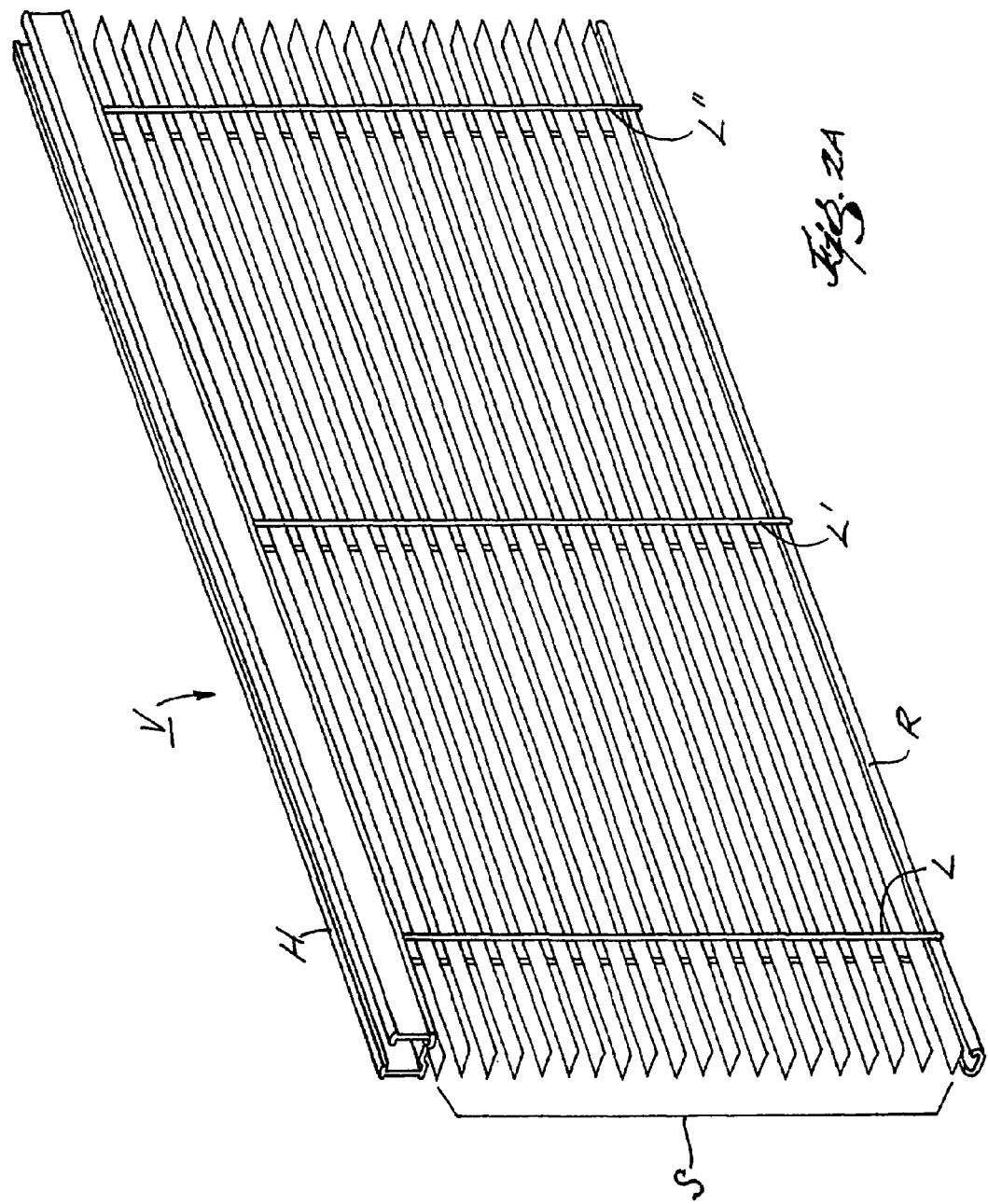

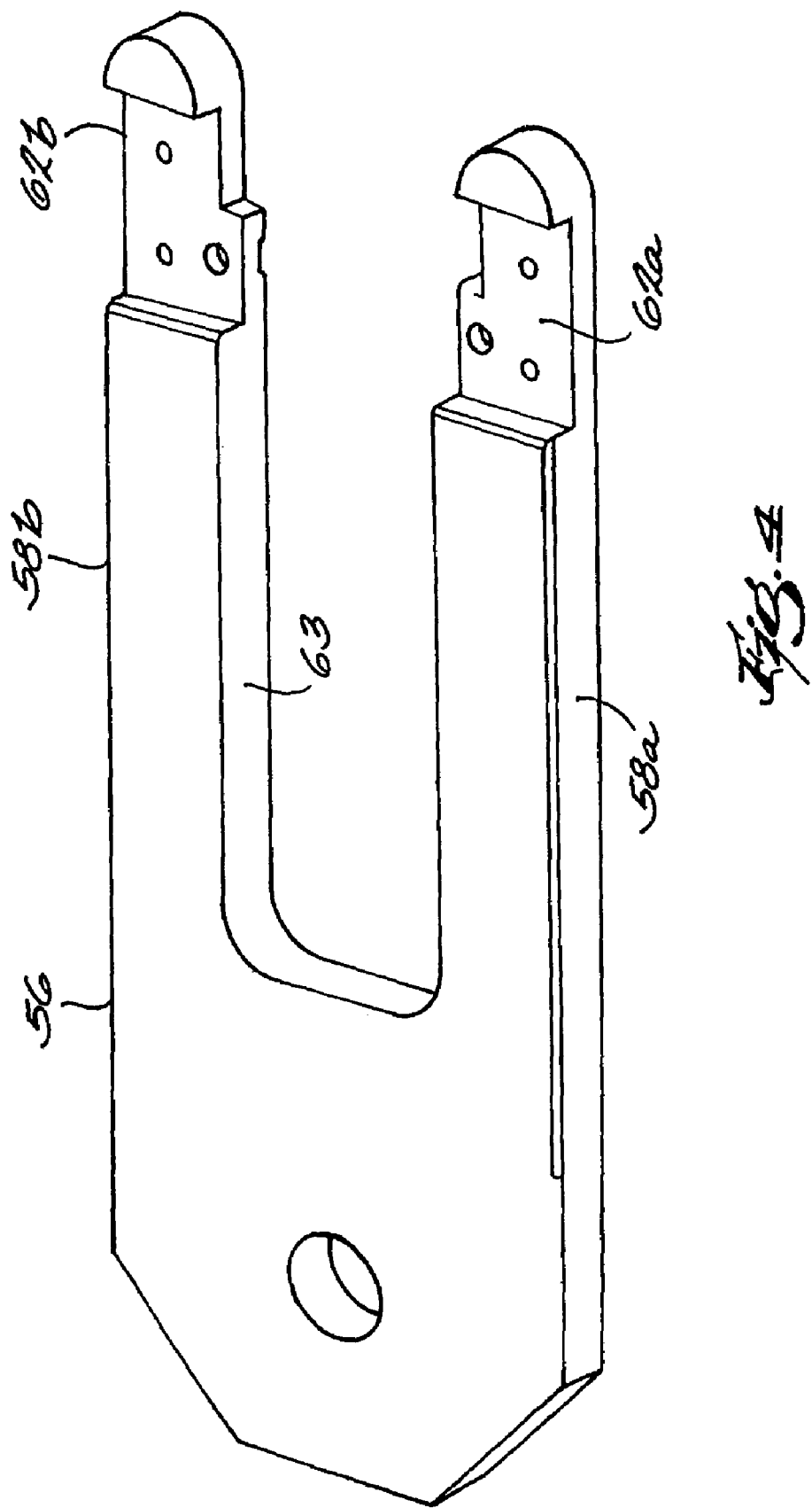

BLIND TRIMMING APPARATUS

RELATED APPLICATIONS

The present application is a continuation-in-part of application Ser. No. 10/610,686, filed Jul. 1, 2003 now abandoned.

FIELD OF THE INVENTION

The present invention relates to an apparatus and a method of trimming blinds.

BACKGROUND OF THE INVENTION

Conventional blinds generally include a headrail, a bottom rail, two or more ladders extending between the headrail and bottom rail, and a number of slats supported by the ladders. Conventional windows are generally manufactured in a number of nonstandard sizes. Therefore, blinds often are custom-made to fit specific windows. Alternatively, blinds can be manufactured in a number of standard sizes and can be trimmed to fit specific windows. In these cases, a blind trimming apparatus is commonly used to trim one or more of the headrail, the bottom rail, and the slats.

A conventional blind trimming apparatus generally includes one or more pairs of opposable cutting blades. The blades are generally moved into engagement to cut the headrail, the bottom rail, and/or the slats.

SUMMARY OF THE INVENTION

For a conventional blind trimming apparatus to operate effectively, the spacing between the pairs of opposable cutting dies must be maintained within a relatively narrow tolerance. Accordingly, setting up and adjusting the opposable cutting dies is generally difficult and can only be done at a high cost by skilled machinists.

During operation, the cutting dies become worn, nicked and/or damaged and occasionally must be replaced and/or repaired. Blade replacement and/or blade repair is a difficult and time-consuming process that can only be performed by highly trained and skilled machinists.

In one embodiment, the invention generally provides a blind trimming apparatus including a frame defining a cutting recess, a cutting tool supported by the frame and extending into the cutting recess, and a cutting blade supported by the frame and moveable across the cutting tool during trimming. One of the cutting tool and the cutting blade includes a locating projection and the other of the cutting tool and the cutting blade defines a locating recess. The locating projection is engageable in the locating recess to index or align one of the cutting blade and the cutting tool with respect to the other of the cutting blade and the cutting tool.

In another embodiment, the invention generally provides a blind trimming apparatus including a frame defining a cutting recess, a cutting tool supported by the frame and extending into the cutting recess, a cutting blade moveable across the cutting tool during trimming, and an elastic member biasing one of the cutting blade and the cutting tool into shearing engagement with the other of the cutting blade and the cutting tool during trimming.

In another embodiment, the invention generally provides a blind trimming apparatus including a frame defining a cutting recess and having a rail and a carriage movable along the rail and supporting a cutting blade. The carriage is moveable along a cutting path and the cutting path is adjustable relative to the frame during trimming. The blind trimming apparatus also includes a cutting tool extending into the cutting recess and being engageable with the cutting blade as the carriage moves along the cutting path.

In another embodiment, the invention generally provides a blind trimming apparatus including a frame defining a cutting recess, and a cutting tool supported by the frame and extending into the cutting recess. The first cutting tool has a first hardness. The blind trimming apparatus also includes a cutting blade moveable across the cutting recess and engageable with the cutting tool during trimming to shear blinds against the cutting tool. The cutting blade has a second hardness and the second hardness is greater than the first hardness.

In another embodiment, the invention generally provides a blind trimming apparatus including a frame defining a cutting recess, a cutting tool supported by the frame and extending into the cutting recess, a cutting blade moveable along a cutting path and being engageable with the cutting tool during trimming to shear blinds against the cutting tool, and an insert positioned along the cutting path to support blinds during shearing.

The invention also provides a method of trimming blinds. The method generally includes providing a blind trimming apparatus including a frame defining a cutting recess, a cutting tool supported by the frame and extending into the cutting recess, and a carriage supporting a cutting blade and being moveable along a cutting path. The method includes moving the carriage along the cutting path in a direction generally toward the cutting tool, adjusting the cutting path relative to the frame to index or align the cutting blade and the cutting tool, and shearing at least a portion of the blinds between the cutting tool and the cutting blade.

In addition, the invention generally provides a blind trimming apparatus including a frame supporting a cutting tool, the cutting tool including a cutting edge, a blade holder supported on the frame for movement with respect to the cutting tool along a cutting path, and a blade insert including a cutting edge and being connectable to the blade holder for movement with the blade holder with respect to the cutting tool to trim blinds between the cutting edge of the cutting tool and the cutting edge of the blade insert. One of the blade holder and the blade insert defines a locating recess and another of the blade holder and the blade insert has a locating protrusion. The locating protrusion is engageable in the locating recess to align the blade insert with respect to the blade holder so that, during cutting, the cutting edge of the blade insert is spaced a predetermined distance from the cutting edge of the cutting tool measured along a plane. The plane is substantially perpendicular to the cutting path and extends through the cutting tool.

In other embodiments, the invention generally provides a blind trimming apparatus including a frame supporting a cutting tool, the cutting tool including a cutting edge, a blade holder supported on the frame for movement with respect to the cutting tool along a cutting path, and a blade insert including a cutting edge and being connectable to the blade holder for movement with the blade holder with respect to the cutting tool to trim blinds between the cutting edge of the cutting tool and the cutting edge of the blade insert. One of the blade holder and the blade insert includes a locating protrusion, at least a portion of the locating protrusion being angled with respect to the cutting path, and another of the blade holder and the blade insert defines a locating recess. The locating protrusion is engageable in the locating recess to align the blade insert with respect to the blade holder.

The invention also provides a method of operating a blind trimming apparatus. The method generally includes the acts of providing a frame supporting a cutting tool, the cutting tool having a cutting edge, connecting a blade holder to the frame for movement with respect to the frame along a cutting path, providing a blade insert having a cutting edge, one of the blade insert and the blade holder having a locating protrusion, an other of the blade insert and the blade holder defining a locating recess, connecting the blade insert to the blade holder, and moving the blade holder and the blade insert with respect to the cutting tool along the cutting path to shear blinds between the cutting edge of the cutting tool and the cutting edge of the blade insert. The act of connecting the blade insert to the blade holder may include the act of engaging the locating protrusion in the locating recess to orient the blade insert with respect to the blade holder so that, during cutting, the cutting edge of the blade insert is spaced a predetermined distance from the cutting edge of the cutting tool measured along a plane extending through the cutting tool. The plane is generally perpendicular to the cutting path.

In other embodiments, the method generally includes the acts of providing a frame supporting a cutting tool, the cutting tool having a cutting edge, connecting a blade holder to the frame for movement with respect to the frame along a cutting path, providing a blade insert having a cutting edge, one of the blade insert and the blade holder having a locating protrusion, an other of the blade insert and the blade holder including a ramp, connecting the blade insert to the blade holder, and moving the blade holder and the blade insert with respect to the cutting tool along the cutting path to shear blinds between the cutting edge of the cutting tool and the cutting edge of the blade insert, the ramp being angled with respect to the cutting path. The act of connecting the blade insert to the blade holder may include the act of moving the locating protrusion along the ramp to orient the blade insert with respect to the blade holder so that, during cutting, the cutting edge of the blade insert is spaced a predetermined distance from the cutting edge of the cutting tool measured along a plane extending through the cutting tool. The plane is generally perpendicular to the cutting path.

Other independent features and independent advantages of the present invention will become apparent to those skilled in the art upon review of the following detailed description, claims, and drawings.

The present invention is further described with reference to the accompanying drawings, which show various constructions of the present invention. However, it should be noted that the invention is explained and illustrated by way of example only. The various elements and combinations of elements described below and illustrated in the drawings can be arranged and organized differently to result in constructions which are still within the spirit and scope of the present invention. Also, it is understood that the phraseology and terminology used herein is for the purpose of description and should not be regarded as limiting.

BRIEF DESCRIPTION OF THE DRAWINGS

In the drawings, wherein like reference numerals indicate like parts:

FIG. 2 is an enlarged sectional view of the blind trimming apparatus taken along line II-II in FIG. 1B.

FIG. 2A is a perspective view of a conventional venetian blind.

FIG. 4 is an enlarged perspective view of a portion of the blade arrangement shown in FIGS. 1A and 1B.

DETAILED DESCRIPTION

Before at least one construction of the invention is explained in detail, it is to be understood that the phraseology and terminology used herein with reference to element orientation (such as, for example, terms like "upper", "side", "forward", "rearward", "upward", etc.) are only used to simplify description of the present invention, and do not alone indicate or imply that the element referred to must have a particular orientation. In addition, terms such as "first", "second", and "third" are used herein for purposes of description and are not intended to indicate or imply relative importance or significance.

The drawings illustrate a blind trimming apparatus 10 which embodies the invention and which is adapted to trim a blind assembly V to length. FIG. 2A illustrates a conventional venetian blind V having a headrail H, a bottom rail R, three spaced-apart vertically extending ladders L, L', L" extending between the headrail H and the bottom rail R, and a number of slats S supported by the ladders L, L', L". While the present invention is described herein as being used to trim venetian blinds V having a headrail H, a bottom rail R, and slats S in a single operation, one having ordinary skill in the art will appreciate that the present invention can also successfully be used to trim the individual elements or combinations of elements of the blinds (e.g., the bottom rail R, all of the slats S, individual slats S, and the headrail H). Additionally, one having ordinary skill in the art will appreciate that, while the invention is described herein as being operable to trim venetian blinds, the invention can also successfully be used to trim other window coverings.

Figure 1A:
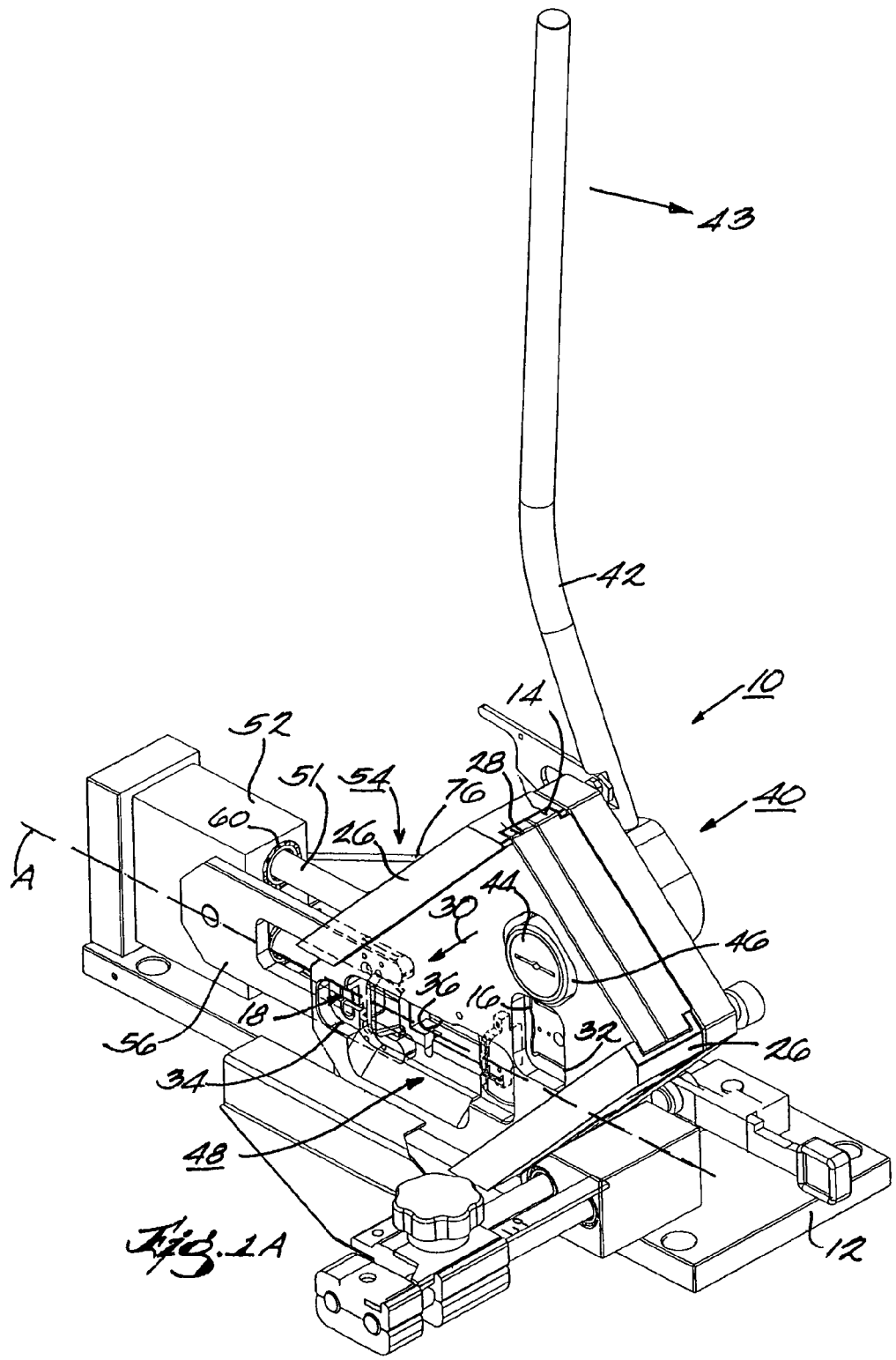
FIGS. 1A and 1B are perspective views of a blind trimming apparatus, including a blade arrangement, embodying the invention.
Figure 1B:
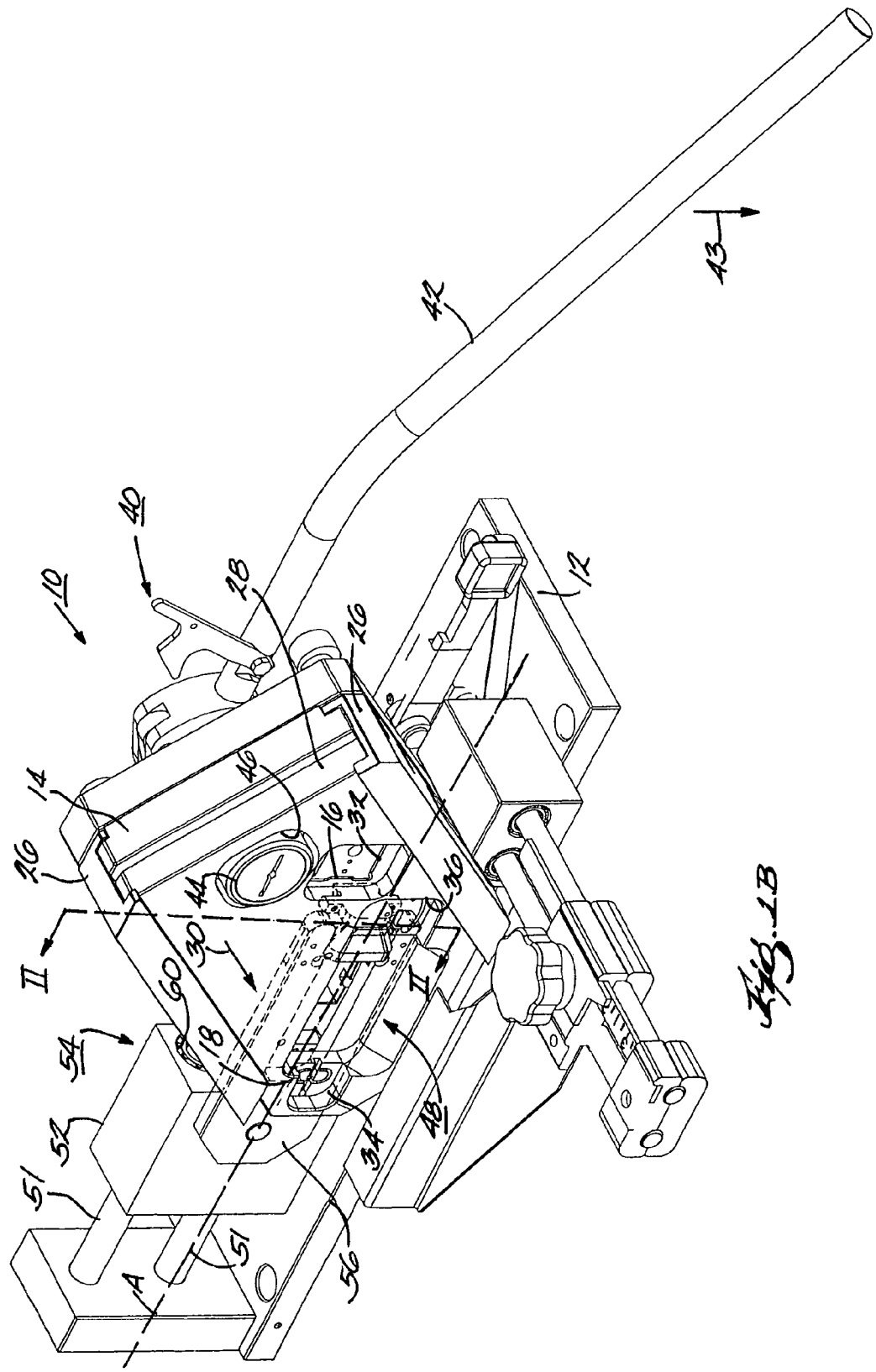

A blind trimming apparatus 10, embodying the invention is illustrated in FIGS. 1A, 1B, and 2. Portions of the apparatus 10 are similar to conventional blind trimming apparatus, such as those described in U.S. Pat. Nos. 5,806,394, 6,178,857, and 6,196,099 and Published U.S. patent application No. 2001/0054338, which are incorporated herein by reference.

As shown in FIGS. 1A, 1B, 2, 3A, and 3B, the apparatus 10 includes a base plate 12 and a frame 14 fixed to and extending upwardly from the base plate 12. The frame 14 at least partially defines (FIG. 3A) a headrail opening 16 adapted to receive headrails H, a bottom rail opening 18 adapted to receive bottom rails R, and an elongated blind slat opening 20 adapted to receive slats S. A first axis A extends in a generally horizontal direction through the frame 14 and the blind slat opening 20.

As shown in FIGS. 1A, and 1B, guides or rails 26 extend along a face of the frame 14 and support a first carriage or die plate 28 for sliding movement in a direction substantially parallel to the rails 26 along a first cutting path 30 between a first retracted position (shown in FIG. 1A) and a first extended position (shown in FIG. 1B). The rails 26 are spaced-apart and extend along generally parallel axes at an angle of about 45 degrees with respect to axis A. In this manner, at least a portion of the first cutting path (represented by arrow 30 in FIGS. 1A and 1B) of the first carriage 28 is at an angle of about 45 degrees with respect to the first axis A. It would be readily understood, however, that the rails 26 can be successfully arranged differently to facilitate movement of the first carriage 28 along an arcuate path, a horizontal path, a vertical path, or otherwise to define the desired cutting path.

As shown in FIGS. 1A and 1B, the first carriage 28 defines a headrail recess 32, a bottom rail recess 34, and a central cutout 36. The headrail recess 32 and the bottom rail recess 34 are arranged to correspond with the locations of the headrail opening 16 and the bottom rail opening 18, respectively. As described in greater detail below, during trimming operations, a portion of a headrail H is inserted through the headrail opening 16 and into the headrail recess 32 and a bottom rail R is inserted through the bottom rail opening 18 and into the bottom rail recess 34. The first carriage 28 is then moved along the first cutting path 30 (i.e., in a generally downward path) laterally with respect to the frame 14 to shear the headrail H and the bottom rail R between the first carriage 28 and the frame 14.

The blind trimming apparatus 10 also includes a drive assembly 40 that is operable to move the first carriage 28 along the first cutting path 30. The drive assembly 40 includes a handle or lever 42 which is fixed to an eccentric cam 44 and which is operable to pivot the eccentric cam 44 into engagement with an aperture 46 in the first carriage 28. In this manner, when the handle 42 is pivoted downwardly (i.e., in the direction of arrow 43 in FIGS. 1A and 1B) from a first position (shown in FIG. 1A) to a second position (shown in FIG. 1B), the eccentric cam 44 pivots into engagement with a lower edge of the aperture 46, causing the first carriage 28 to move downwardly along the first cutting path 30 toward the first extended position. As the first carriage 28 moves along the first cutting path 30, the headrail H is sheared between the headrail opening 16 in the frame 14 and the headrail recess 32 in the first carriage 28 and the bottom rail R is sheared between the bottom rail opening 18 in the frame 14 and the bottom rail recess 34 in the first carriage 28. After the headrail H and bottom rail R are trimmed, the handle 42 can be returned from the second position to the first position to thereby also return the first carriage 28 to the retracted position.

The blind trimming apparatus 10 also includes a blade arrangement 48 having a second carriage 56. As shown in FIGS. 2, 3A, 3B, and 4, the second carriage 56 is a substantially U-shaped member having forwardly extending spaced-apart legs 58a, 58b and defining an internal space 63 between the legs 58a, 58b. Forward ends of the legs 58a, 58b define blade recesses 62a, 62b (shown in FIGS. 2 and 4).

Guides or rails 50 (shown in FIGS. 2, 3A, and 3B) extend into the frame 14 and extend laterally along a surface of the frame 14 in a direction substantially parallel to the first axis A. The second carriage 56 is slideably mounted on the rails 50 for movement along a second cutting path (represented by arrow 57 in FIGS. 3A and 3B) extending between a second retracted position of the carriage 56 (shown in FIGS. 1A and 3A) and a second extended position of the carriage 56 (shown in FIGS. 1B and 3B).

Additionally, the blind trimming apparatus 10 includes a second drive assembly 54 (shown in FIGS. 1A and 1B) that is operable to move the second carriage 56 between the second retracted position and the second extended position. As illustrated in FIGS. 1A and 1B, the drive assembly 54 includes two spaced-apart cylindrical rails 51 supported on the base plate 12. The second carriage 56 is coupled to a follower 52 with two parallel through-holes 60. The rails 51 extend through the through-holes 60 in the follower 52 to guide movement of the second carriage 56 between the second retracted position and the second extended position.

The second drive assembly 54 also includes a connecting rod 76 (shown in FIG. 1A) operably connected to the first drive assembly 40 so that pivoting movement of the handle 42 also causes movement of the second carriage 56 between the second retracted position and the second extended position. In this manner, an operator can simultaneously move both the first and second carriages 28, 56 between their respective retracted and extended positions with a movement of a single handle 42. In alternate embodiments, the first and second drive assemblies 40, 54 can be uncoupled and made to be independently operable so that the first and second carriages 28, 56 can be moved independently.

Figure 3A:
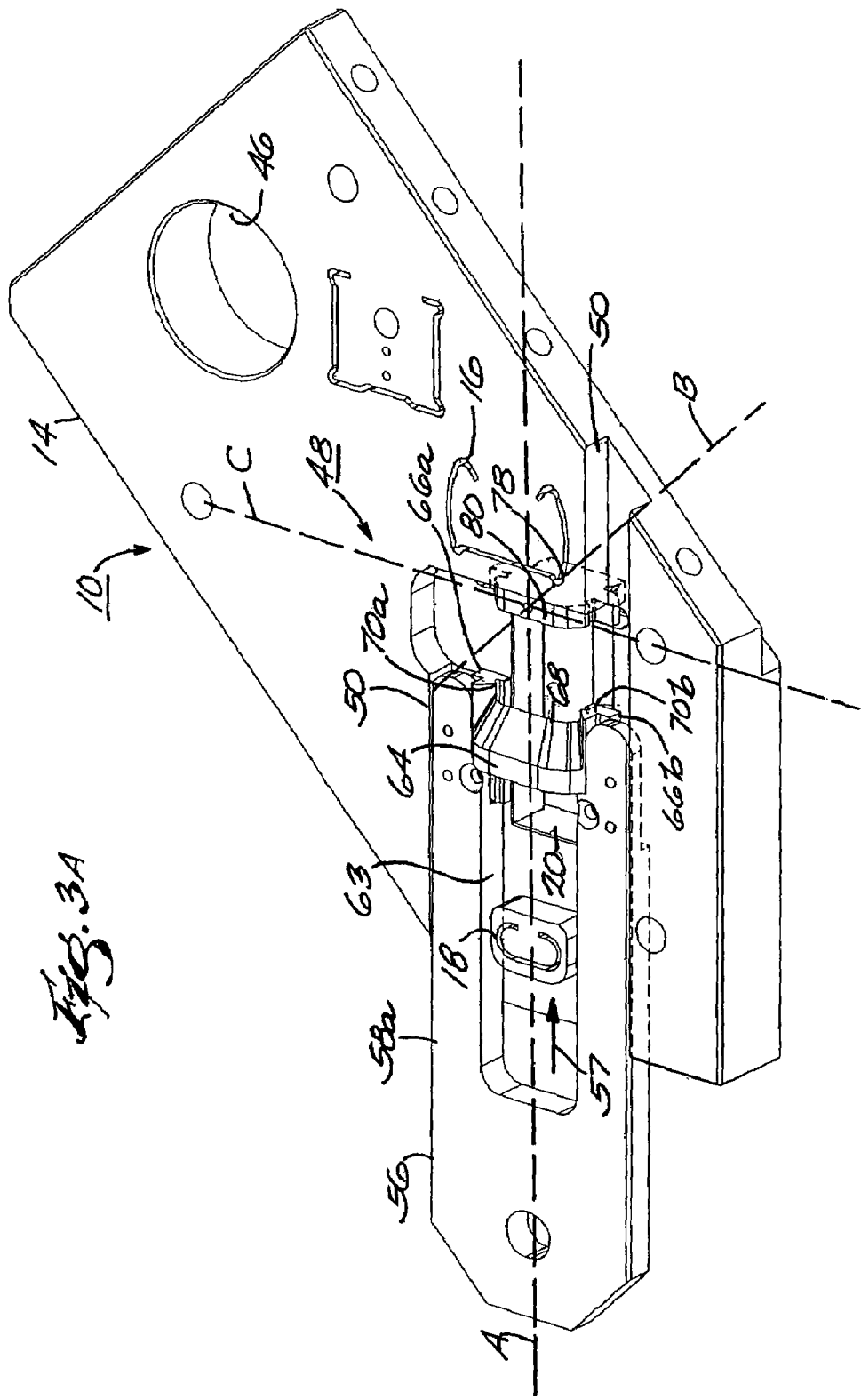
FIGS. 3A and 3B are enlarged perspective views of a portion of the blade arrangement shown in FIGS. 1A and 1B.
Figure 3B:
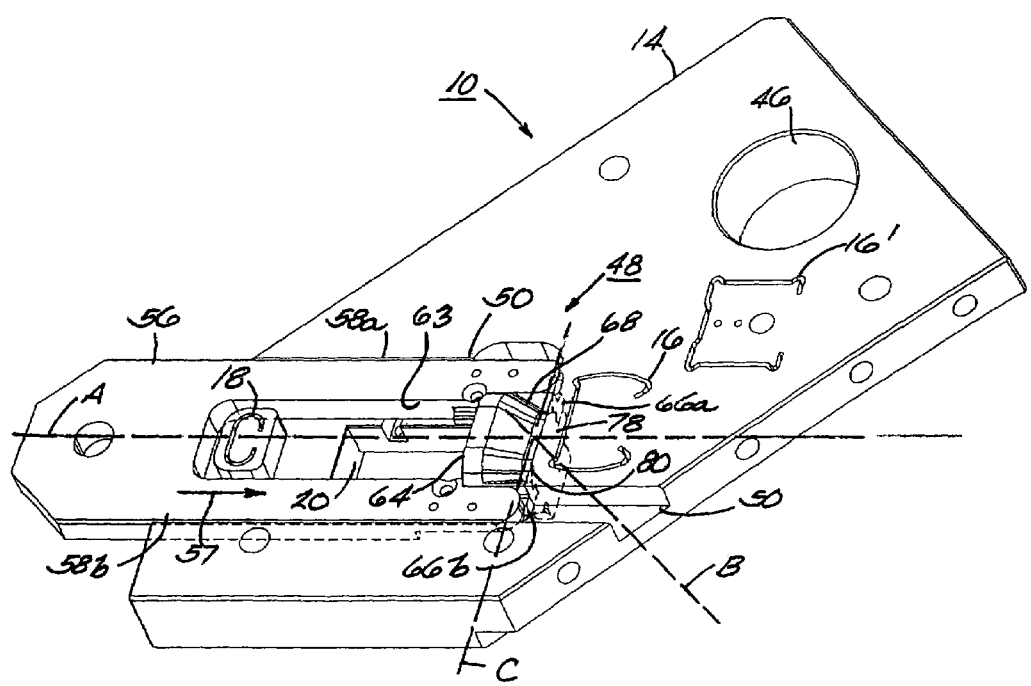
Figure 5:
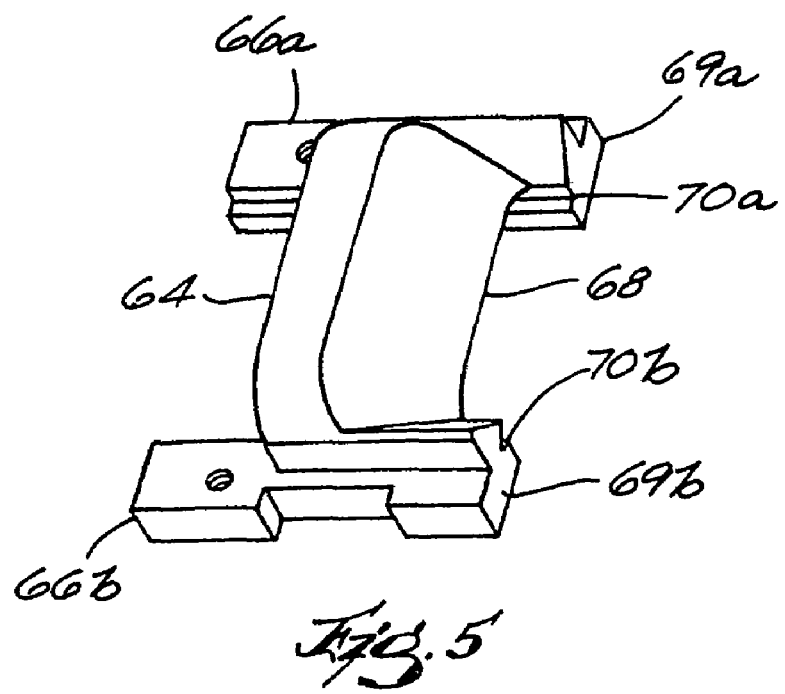
FIG. 5 is an enlarged perspective view of a portion of the blade arrangement shown in FIGS. 1A and 1B.

The blade arrangement 48 also includes a cutting blade 64, which is coupled to the forward ends of the legs 58a, 58b and extends across the internal space 63. In some aspects and in the illustrated construction, the cutting blade 64 includes laterally extending flanges 66a, 66b and an arcuately shaped cutting edge 68 extending between the flanges 66a, 66b. As shown in FIGS. 3A, 3B, and 5, the flanges 66a, 66b are configured to be received in and closely engage the blade recesses 62a, 62b of the second carriage 56. Forward portions 69a, 69b of the flanges 66a, 66b extend outwardly from the leading edge of the cutting blade 64 a short distance (e.g., between about 0.10 inches and about 0.23 inches in the illustrated construction) beyond the cutting edge 68.

As shown in FIGS. 3A and 5, the flanges 66a, 66b define locating recesses 70a, 70b. In some aspects and in the illustrated construction, the locating recesses 70a, 70b are generally C-shaped notches located on interior sides (i.e., opening toward the interior space 63) and extend laterally through the flanges 66a, 66b in a direction substantially parallel to the first axis A. However, while not shown, the recesses 70a, 70b can be located in other positions on one or both of the legs 58a, 58b of the second carriage 56 and/or on the cutting blade 64. In some aspects and in the illustrated construction, forward ends of the locating recesses 70a, 70b open through the forward portions 69a, 69b of the flanges 66a, 66b. In this manner, the forward ends of the locating recesses 70a, 70b are spaced a short distance from the cutting edge 68 along the first axis A.

During trimming operations and over time, the cutting edge 68 can become nicked, dulled, and/or misshapen. To afford ready removal of the cutting blade 64 for maintenance and repair, the blade arrangement 48 also includes fasteners (not shown) which selectively and removeably fix the flanges 66a, 66b to the legs 58a, 58b. In this manner, when the cutting edge 68 is damaged, an operator can remove the cutting blade 64 for sharpening, or alternatively, an operator can replace the damaged cutting blade 64.

Figure 6:
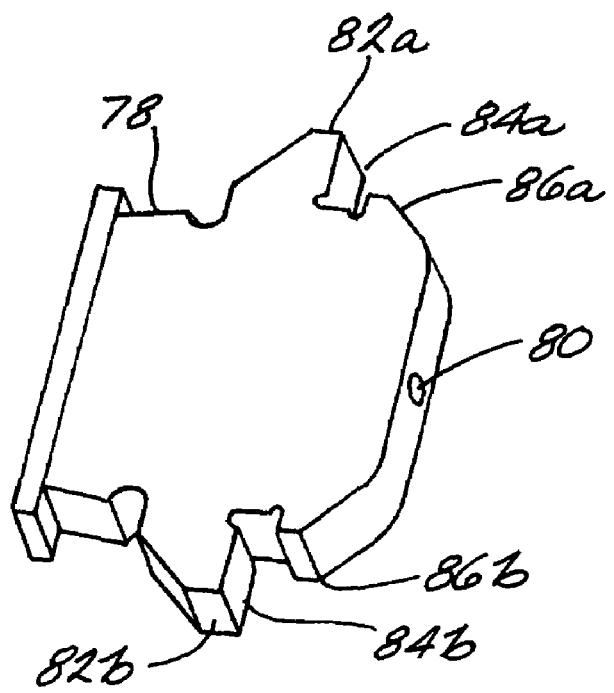
FIG. 6 is an enlarged perspective view of a portion of the blade arrangement shown in FIGS. 1A and 1B.

In the construction illustrated in FIG. 6, the cutting tool 78 includes a support flange 79 which extends outwardly from a rearward end of the cutting tool 78 and is configured to be received in a slotted recess (not shown) in the frame 14. The support flange 79 travels with the cutting tool 78 along the slotted recess in the frame 14 to accommodate movement of the cutting tool 78 during trimming operations. Additionally, the engagement between the support flange 79 and the slotted recess limits movement of the cutting tool 78 relative to the frame 14 within a desired travel area or path and prevents the cutting tool 78 from inadvertently becoming separated from the frame 14.

As shown in FIGS. 2, 3A, 3B, and 6, the blade arrangement 48 also includes a die or cutting tool 78, which extends outwardly from the frame 14 into the blind slat opening 20 and defines a second axis B that intersects the first axis A at an angle of approximately 90 degrees. The cutting tool 78 is moveably coupled to the frame 14 for movement along the second axis B. Additionally, in some aspects and in some constructions, the cutting tool 78 is moveably coupled to the frame 14 for movement along a third axis C, which is substantially perpendicular to the first and second axes A, B.

As shown in FIG. 6, the cutting tool 78 has a generally arcuately shaped cutting edge 80 that is shaped to correspond to the generally arcuately shaped cutting edge 68 of the cutting blade 64. More particularly, as described in detail below, the cutting edge 80 is arranged and shaped to closely engage the cutting edge 68 of the cutting blade 64 to shear portions of the blind slats S located in the blind slat opening 20. In other aspects and in other constructions (not shown), one or both of the cutting edges 68, 80 can have any other shape to provide different blind slat configurations (e.g., dog-eared, pointed, and the like) but are preferably similarly shaped to facilitate a shearing interaction during trimming operations.

Flanges 82a, 82b extend outwardly from the cutting tool 78 on opposite sides of the cutting edge 80 and include respective engagement surfaces 84a, 84b. Additionally as shown in FIG. 6, the cutting tool 78 includes two substantially pointed locating projections 86a, 86b. In other aspects and in other constructions (not shown), the cutting tool 78 can include one, three, or more locating projections 86a, 86b. Additionally, in other aspects and in other constructions (not shown), the locating projections 86a, 86b, can have other shapes and configurations (e.g., arcuate, dog-eared, T-shaped, and the like). As explained in greater detail below, the locating projections 86a, 86b are configured to matingly engage the locating recesses 70a, 70b on the cutting blade 64 to facilitate indexing or alignment of the cutting tool 78 with respect to the cutting blade 64.

During operation of the trimming apparatus 10, an operator moves the first and second carriages 28, 56 to the first and second retracted positions (as shown in FIG. 1A and as partially shown in FIG. 3A). The operator then inserts a portion of the headrail H through the headrail opening 16 and into the headrail recess 32, a portion of the bottom rail R through the bottom rail opening 18 and into the bottom rail recess 34, and the blind slats S into the blind slat opening 20 and the central cutout 36.

The operator then operates the first and second drive assemblies 40, 54 to move the first and second carriages 28, 56. In particular, the operator pivots the handle 42 (e.g., in a clockwise direction as represented by arrow 43 in FIGS. 1A and 1B), moving the first and second carriages 28, 56 along the first and second cutting paths 30, 57, respectively. As described above, as the first carriage 28 moves along the first cutting path 30 and cooperates with the frame 14 to shear one or both of the headrail H and the bottom rail R.

As the second carriage 56 moves along the second cutting path 57, the cutting edge 68 of the cutting blade 64 engages individual slats S located in the blind slat opening 20. Lateral motion of the cutting blade 64 causes the cutting edge 68 to cut through or trim the individual slats S. As shown in FIGS. 1B and 3B, as the second carriage 56 continues along the second cutting path 57, the cutting blade 64 approaches the cutting tool 78. As the second carriage 56 continues to move along the second cutting path 57, the forward ends of the locating recesses 70a, 70b move into engagement with the locating projections 86a, 86b of the cutting tool 78. The engagement between the locating projections 86a, 86b and the locating recesses 70a, 70b causes the cutting tool 78 to move along the second axis B into engagement with the cutting blade 64.

Also or alternatively, in some constructions and in some aspects, the engagement between the locating recesses 70a, 70b and the locating projections 86a, 86b causes the cutting tool 78 to move along the third axis C into engagement with the cutting blade 64. More particularly, the engagement between the locating recesses 70a, 70b and the locating projections 86a, 86b indexes or aligns the cutting blade 64 and the cutting tool 78 so that as the cutting edge 68 of the cutting blade 64 passes across the cutting edge 80 of the cutting tool 78, the cutting edges 68, 80 are spaced-apart by a predetermined distance (e.g., between about 0.000 inches and about 0.001 inches). Movement of the cutting tool 78 along the second axis B is limited by the interaction between the engagement surfaces 84*a*, 84*b* and the flanges 66*a*, 66*b* so that the cutting edge 80 of the cutting tool 78 is preferably prevented from moving into locking engagement with the cutting blade 64.

Because the engagement between the cutting edges 68, 80 is so closely controlled, the last few slats S are sheared and are not bent or torn. Additionally, because the cutting tool 78 is indexed or aligned with respect to the cutting blade 64, set up and adjustment of the blind trimming apparatus 10 is relatively simple. More particularly, in some aspects and in some constructions, an operator is not required to closely calibrate the relative position of the cutting blade 64 and the cutting tool 78 during set up. Rather, cutting blade 64 and cutting tool 78 replacement is accomplished using conventional fasteners and often does not require shims or other adjustment and measuring apparatuses.

Figure 7:
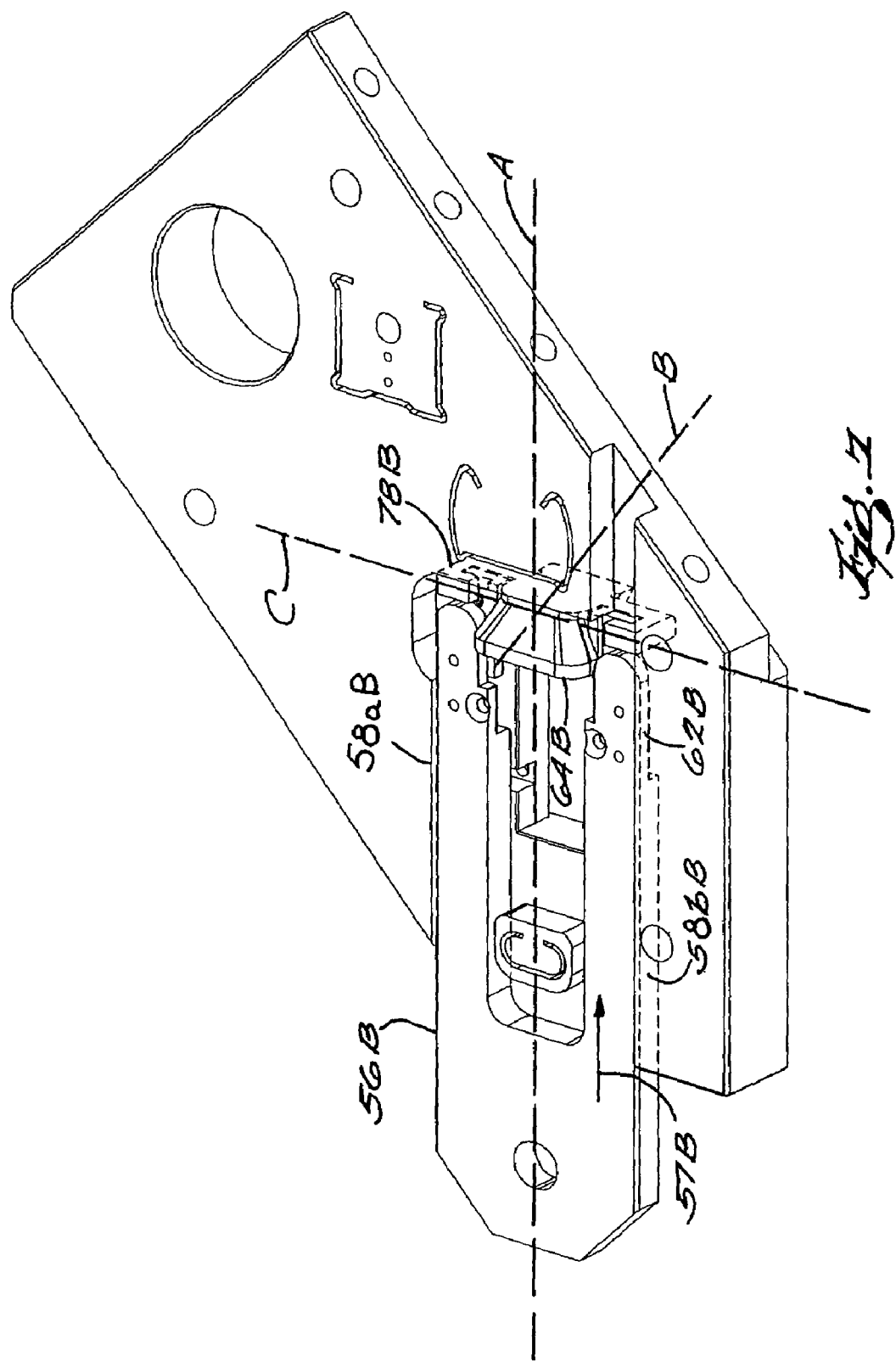
FIG. 7 illustrates a second construction of a blade arrangement for a blind trimming apparatus embodying the invention.
Figure 8:
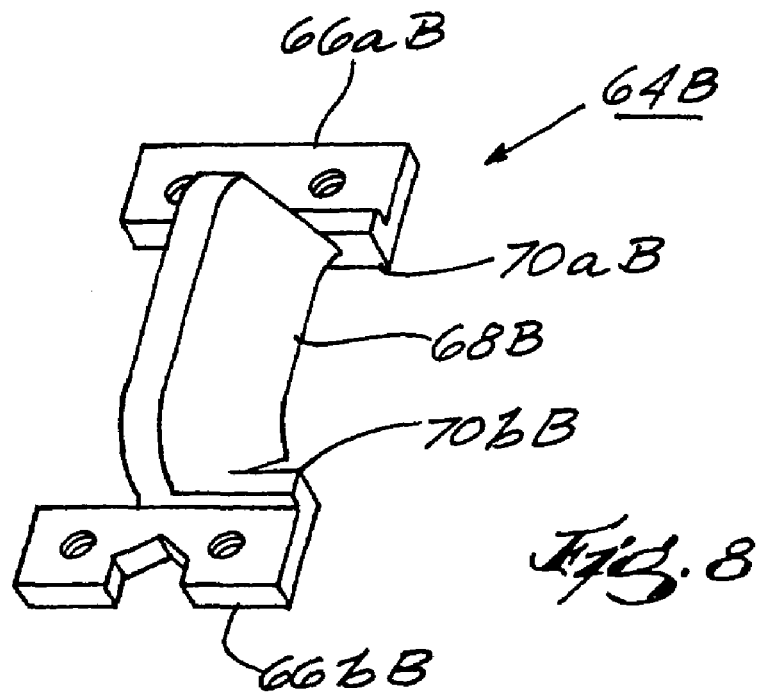
FIG. 8 is an enlarged perspective view of a portion of the blade arrangement shown in FIG. 7.
Figure 9:
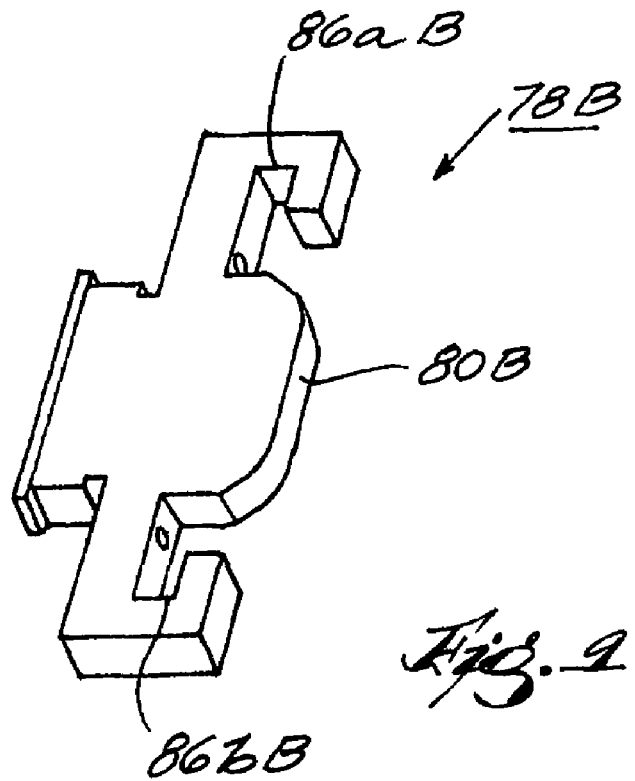
FIG. 9 is an enlarged perspective view of a portion of the blade arrangement shown in FIG. 7.

A second construction of a blade arrangement 48B for the blind trimming apparatus 10 is illustrated in FIGS. 7-9. Common elements are identified by the same reference number "B".

As shown in FIG. 7, a carriage 56B is moveable along a cutting path (represented by arrow 57B in FIG. 7) which is substantially parallel to the first axis A. The carriage 56B supports a cutting blade 64B, having flanges 66*a*B, 66*b*B and a cutting edge 68B extending between the flanges 66*a*B, 66*b*B. In some aspects and in the illustrated construction, forwardly extending legs 58*a*B, 58*b*B of the carriage 56B define blade recesses 62B (only one is shown in FIG. 7) and the flanges 66*a*B, 66*b*B are positioned in the blade recesses 62B. Fasteners (not shown) removeably couple the flanges 66*a*B, 66*b*B to the carriage 56B and facilitate blade removal and blade replacement.

Interior sides of the flanges 66*a*B, 66*b*B provide locating projections 70*a*B, 70*b*B. In some aspects and in the construction illustrated in FIG. 7, the locating projections 70*a*B, 70*b*B are rectangularly shaped and extend laterally along the length of the flanges 66*a*B, 66*b*B. However, in other aspects and in other constructions (not shown), the locating projections 70*a*B, 70*b*B can have other shapes and configurations (e.g, dog-eared, T-shaped, pointed, arcuate, and the like).

The frame 14 supports a cutting tool 78B having a cutting edge 80B and defining locating recesses 86*a*B, 86*b*B located on opposite sides of the cutting edge 80B. In some aspects and in the illustrated construction, the locating recesses 86*a*B, 86*b*B are substantially rectangular and are configured to matingly engage the locating projections 70*a*B, 70*b*B of the cutting blade 64B.

During operation, as the carriage 56B is moved along the cutting path 57B (e.g., by a drive assembly, as described above with respect to the previously described first construction), the cutting edge 68B contacts and trims some of the slats S of the blinds V. As the carriage 56B continues to move along the cutting path 57B, forward ends of the flanges 66*a*B, 66*b*B contact the cutting tool 78B and the locating projections 70*a*B, 70*b*B are moved into engagement with the locating recesses 86*a*B, 86*b*B. The engagement between the locating projections 70*a*B, 70*b*B and the locating recesses 86*a*B, 86*b*B causes the cutting tool 78B to move along the second axis B so that the cutting edges 68B, 80B are spaced-apart a predetermined distance along the second axis B. Alternatively or in addition, the engagement between the locating recesses 86*a*B, 86*b*B and the locating projections 70*a*B, 70*b*B causes the cutting tool 78B to move along the third axis C so that the cutting edges 68B and 80B are spaced-apart a predetermined distance along the third axis C.

Figure 10:
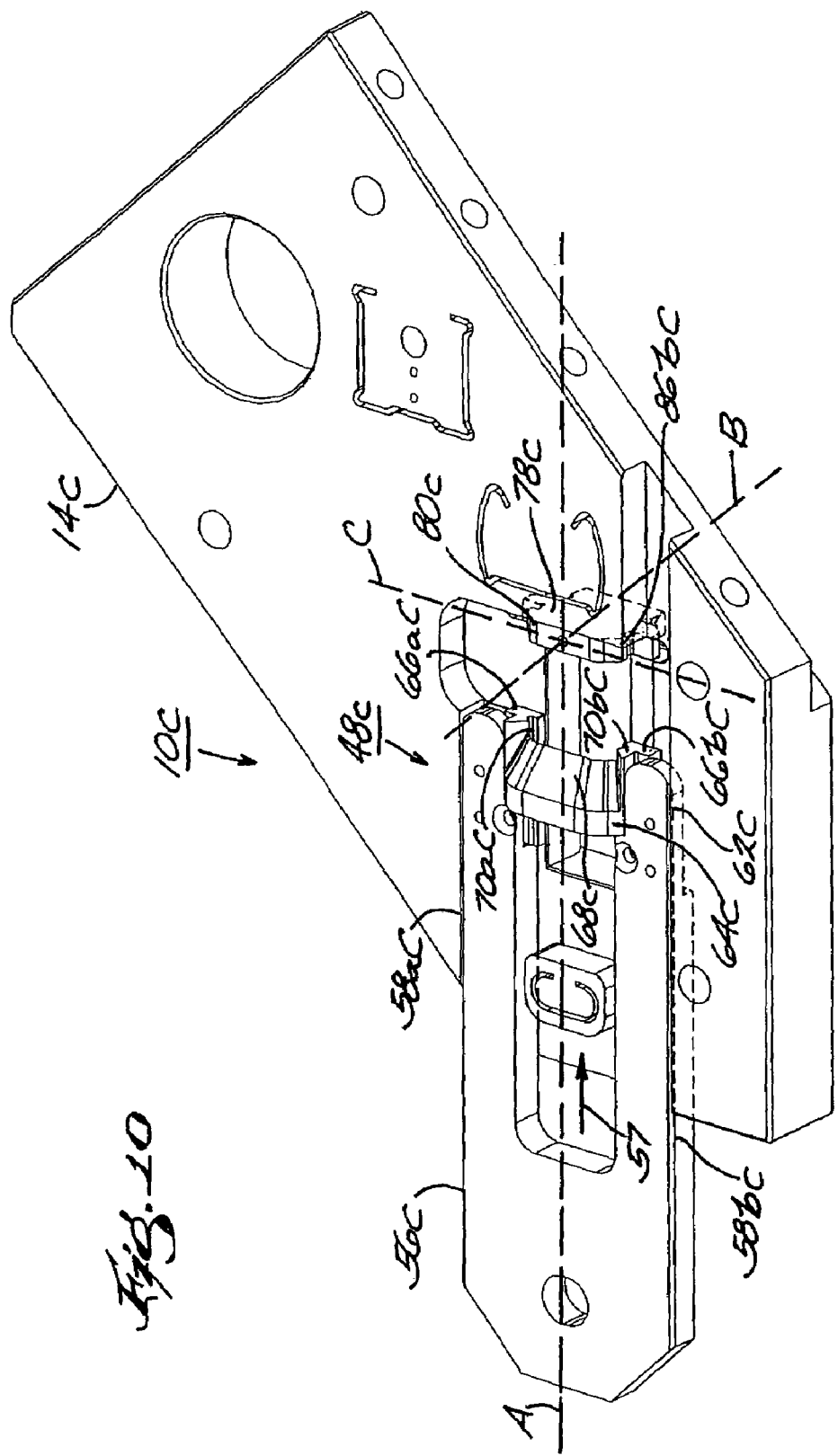
FIG. 10 is a perspective view of a third construction of a blade arrangement for a blind trimming apparatus embodying the invention.

A third construction of a blade arrangement 48C for a blind trimming apparatus 10 is illustrated in FIG. 10. Common elements are identified by the same reference number "C".

As shown in FIG. 10, a carriage 56C is moveable along a cutting path (represented by arrow 57C) which is substantially parallel to the first axis A. The carriage 56C is preferably coupled to a drive assembly (not shown) which is substantially similar to the above-described drive assemblies. The carriage 56C supports a cutting blade 64C, having flanges 66*a*C, 66*b*C and a cutting edge 68C extending between the flanges 66*a*C, 66*b*C. In some aspects and in the illustrated construction, forwardly extending legs 58*a*C, 58*b*C of the carriage 56C define blade recesses 62C (only one is shown in FIG. 10) and the flanges 66*a*C, 66*b*C are positioned in the blade recesses 62C. Fasteners (not shown) removeably couple the flanges 66*a*C, 66*b*C to the carriage 56C and facilitate blade removal and blade replacement.

Interior sides of the flanges 66*a*C, 66*b*C define locating recesses 70*a*C, 70*b*C. In some aspects and in the illustrated construction, the locating recesses 70*a*C, 70*b*C are arcuately shaped and extend laterally through the length of the flanges 66*a*C, 66*b*C. However, in other aspects and in other constructions (not shown), the locating recesses 70*a*C, 70*b*C can have other shapes and configurations (e.g., dog-eared, T-shaped, pointed, and the like).

The frame 14 supports a cutting tool 78C having a cutting edge 80C and providing locating projections 86*a*C, 86*b*C located on opposite sides of the cutting edge 80C. In some aspects and in the illustrated construction, the locating projections 86*a*C, 86*b*C are substantially arcuately shaped and are configured to matingly engage the locating recesses 70*a*C, 70*b*C of the cutting blade 64C.

During operation, as the carriage 56C is moved along the cutting path 57C (e.g., by a drive assembly, as described above with respect to the previously described first construction), the cutting edge 68C contacts and trims some of the slats S of the blinds V. As the carriage 56C continues to move along the cutting path 57C, forward ends of the flanges 66*a*C, 66*b*C contact the cutting tool 78C and the locating projections 86*a*C, 86*b*C are moved into engagement with the locating recesses 70*a*C, 70*b*C. The engagement between the locating projections 86*a*C, 86*b*C and the locating recesses 70*a*C, 70*b*C causes the cutting blade 64C and/or the carriage 56C to move along the second axis B so that the cutting edges 68C and 80C are spaced-apart a predetermined distance along the second axis B. Alternatively or in addition, the engagement between the locating projections 86*a*C, 86*b*C and the locating recesses 70*a*C, 70*b*C causes the cutting blade 64C and/or the carriage 56C to move along the third axis C so that the cutting edges 68B and 80B are spaced-apart a predetermined distance along the third axis C.

Figure 11:
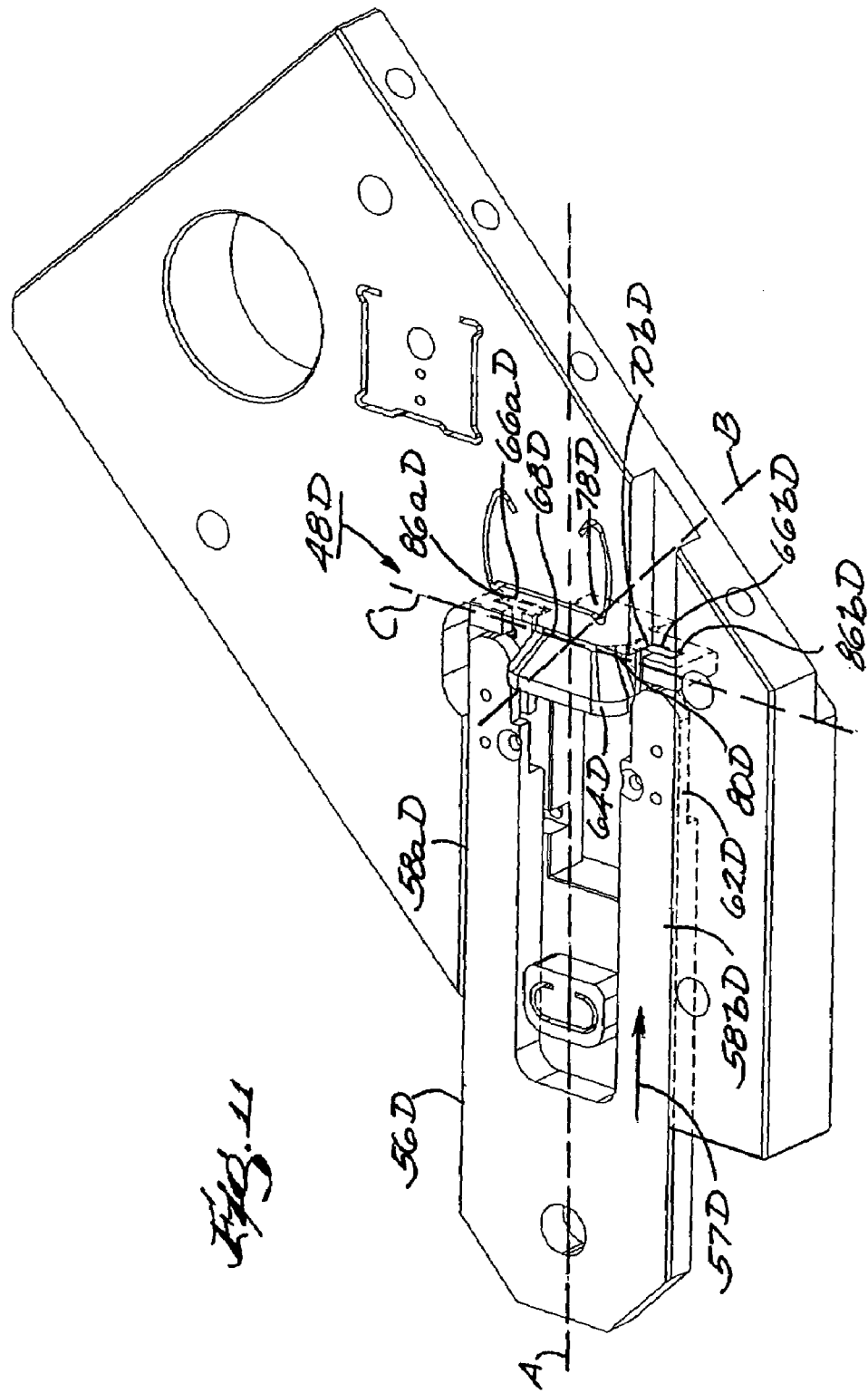
FIG. 11 illustrates a fourth construction of a blade arrangement for a blind trimming apparatus embodying the invention.

A fourth construction of a blade arrangement 48D for a blind trimming apparatus 10 is illustrated in FIG. 11. Common elements are identified by the same reference number "D".

As shown in FIG. 11, a carriage 56D is moveable along a cutting path (represented by arrow 57D) which is substantially parallel to the first axis A. The carriage 56D is preferably coupled to a drive assembly (not shown) which is substantially similar to the above-described drive assemblies. The carriage 56D supports a cutting blade 64D, having flanges 66*a*D, 66*b*D and a cutting edge 68D extending between the flanges 66*a*D, 66*b*D. In some aspects and in the illustrated construction, forwardly extending legs 58*a*D, 58*b*D of the carriage 56D define blade recesses 62D (only one is shown in FIG. 11) and the flanges 66*a*D, 66*b*D are positioned in the blade recesses 62D. Fasteners (not shown) removeably couple the flanges 66*a*D, 66*b*D to the carriage 56D and facilitate blade removal and blade replacement.

Forward portions of the flanges 66*a*D, 66*b*D provide locating projections 70*a*D, 70*b*D. The frame 14 supports a cutting tool 78D having a cutting edge 80D and defining locating recesses 86*a*D, 86*b*D located on opposite sides of the cutting edge 80D.

During operation, as the carriage 56D is moved along the cutting path 57D (e.g., by a drive assembly, as described above with respect to the previously described first construction), the cutting edge 68D contacts and trims some of the slats S of the blinds V. As the carriage 56D continues to move along the cutting path 57D, forward ends of the flanges 66*a*D, 66*b*D contact the cutting tool 78D and the locating projections 70*a*B, 70*b*B are moved into engagement with the locating recesses 86*a*D, 86*b*D. The engagement between the locating projections 70*a*D, 70*b*D and the locating recesses 86*a*D, 86*b*D causes the cutting blade 64D and/or the carriage 56D to move along the second axis B so that the cutting edges 68D and 80D are spaced-apart a predetermined distance along the second axis B during trimming. Alternatively or in addition, the engagement between the locating projections 86*a*D, 86*b*D and the locating recesses 70*a*D, 70*b*D causes the cutting blade 64D and/or the carriage 56D to move along the third axis C so that the cutting edges 68D and 80D are spaced-apart a predetermined distance along the third axis C.

Figure 12:
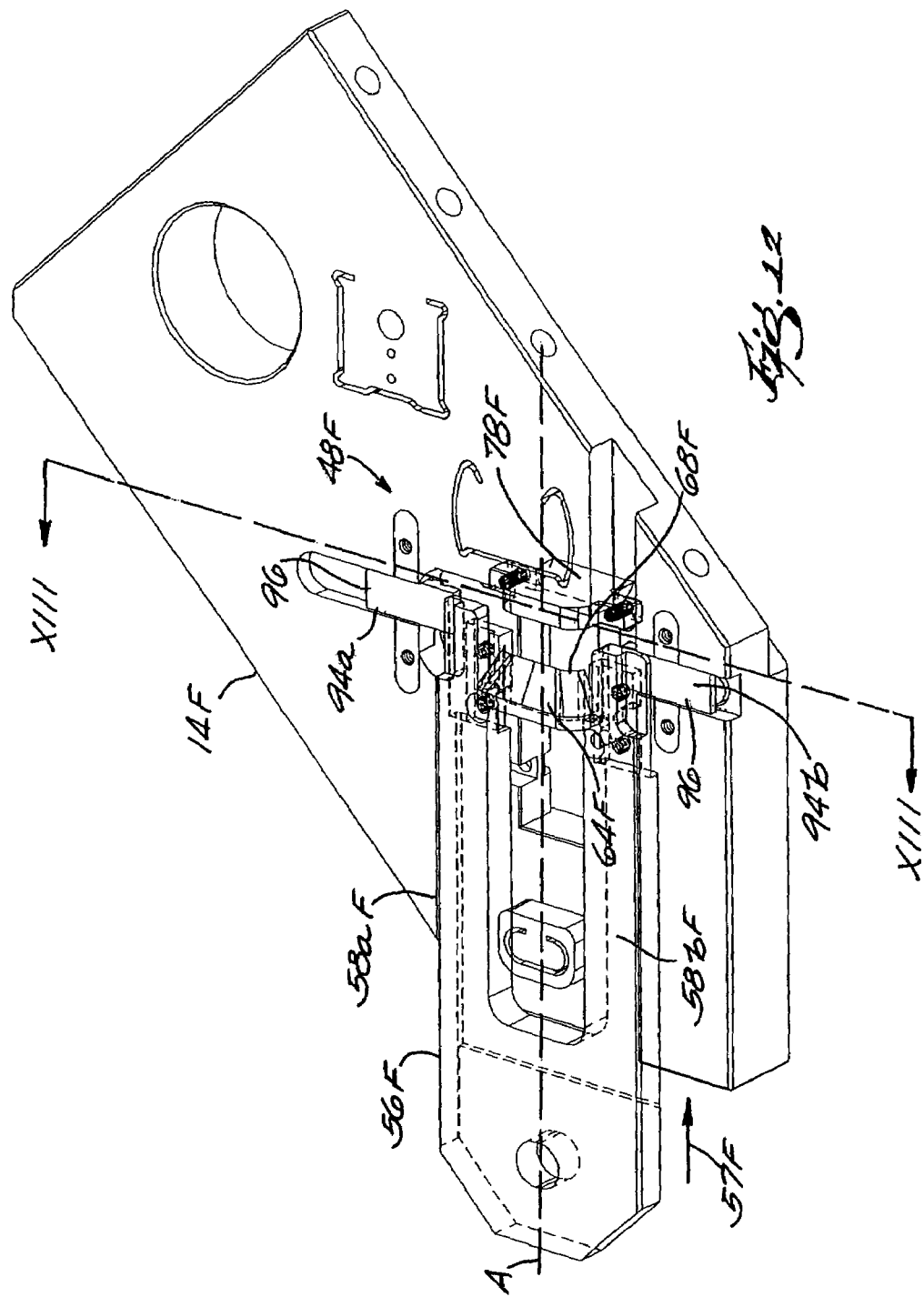
FIG. 12 illustrates a fifth construction of a blade arrangement for a blind trimming apparatus embodying the invention.
Figure 13:
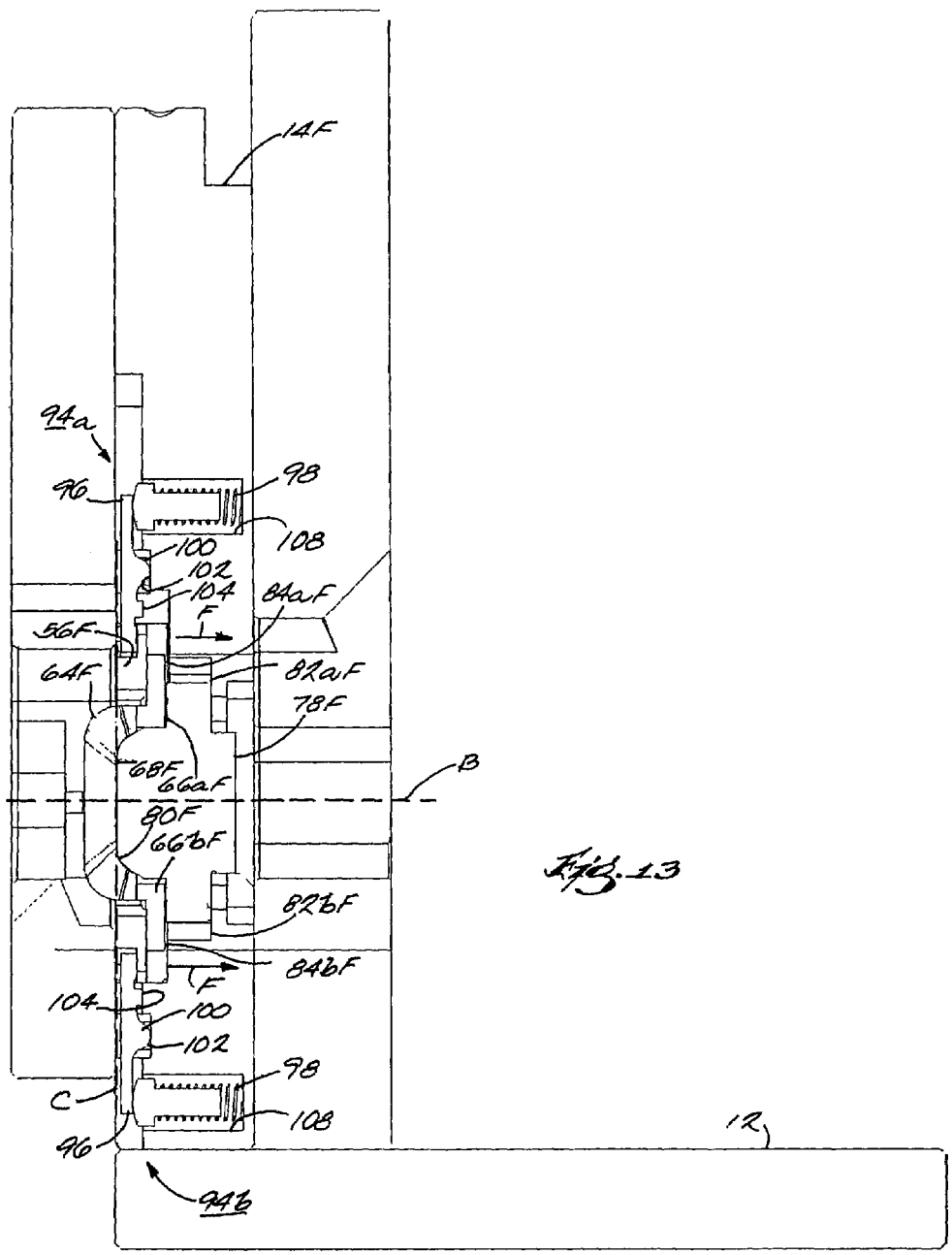
FIG. 13 is an enlarged sectional view taken along line XIII-XIII in FIG. 12.

A fifth construction of a blade arrangement 48E for a blind trimming apparatus 10 is illustrated in FIGS. 12 and 13. Common elements are identified by the same reference number "F".

As shown in FIGS. 12 and 13, a carriage 56F is moveable along a cutting path (represented by arrow 57F) which is substantially parallel to the first axis A. The carriage 56F is preferably coupled to a drive assembly (not shown) which is substantially similar to the above-described drive assemblies. The carriage 56F supports a cutting blade 64F, having flanges 66*a*F, 66*b*F and a cutting edge 68F extending between the flanges 66*a*F, 66*b*F. In the illustrated construction, forwardly extending legs 58*a*F, 58*b*F of the carriage 56F define blade recesses (not shown) and the flanges 66*a*F, 66*b*F are positioned in the blade recesses. Fasteners (not shown) removeably couple the flanges 66*a*F, 66*b*F to the carriage 56F and facilitate blade removal and blade replacement.

The frame 14F supports a cutting tool 78F having a cutting edge 80F and outwardly extending flanges 82*a*F, 82*b*F located on opposite sides of the cutting edge 80F. The flanges 82*a*F, 82*b*F define engagement surfaces 84*a*F, 84*b*F.

The blade arrangement 48F also includes biasing members 94*a*, 94*b*, which are positioned on opposite sides of the cutting path 57F and are operable to bias the carriage 56F and/or the cutting blade 64F into engagement with the cutting tool 78F. More particularly, the biasing members 94*a*, 94*b* are positioned along the first axis A and are operable to bias the cutting edge 68F of the cutting blade 64F into engagement with the cutting edge 80F of the cutting tool 78F.

In some aspects and in the construction illustrated in FIGS. 12 and 13, the biasing members 94*a*, 94*b* include pivot arms 96 and elastic members (e.g., springs) 98. The pivot arms 96 are elongated members, which extend along the frame 14 in a direction substantially parallel to the third axis C. The pivot arms 96 include pivot protrusions 100. Arcuately shaped portions of the pivot protrusions 100 extend into correspondingly contoured recesses 102 in the frame 14. The pivot arms 96 also include pivot limiting protrusions or pivot stops 104 that are located between the pivot protrusions 100 and distal ends and extend outwardly toward the frame 14. The pivot limiting protrusions 104 limit the pivoting movement of the pivot arms 96 in a first direction (e.g., in the construction illustrated in FIG. 13, the pivot limiting protrusions 104 limit pivoting movement toward the frame 14).

At least a portion of the springs (e.g., compression springs, leaf springs, helical springs, and the like) 98 are housed in recesses 108 in the frame 14 and extend outwardly from the frame 14 in a direction that is substantially parallel to the second axis B. The springs 98 engage distal ends of the pivot arms 96, causing the pivot arms 96 to pivot relative to the frame 14F During operation, as the carriage 56F is moved along the cutting path 57F (e.g., by a drive assembly, as described above with respect to the previously described first construction), the cutting edge 68F contacts and trims some of the slats S of the blinds V. As the carriage 56F continues to move along the cutting path 57F, the pivot arms 96 contact the legs 58*a*F, 58*b*F and apply a force (represented by arrows F in FIG. 13) to the carriage 56F. The force F moves the carriage 56F and the cutting blade 64F in a direction substantially parallel to the second axis B and toward the cutting edge 80 of the cutting tool 78. More particularly, the pivot arms 96 move the carriage 56F and the cutting blade 64F into shearing engagement with the cutting edge 80F so that a desired distance is maintained between cutting edges 64F and 80F.

Figure 14:
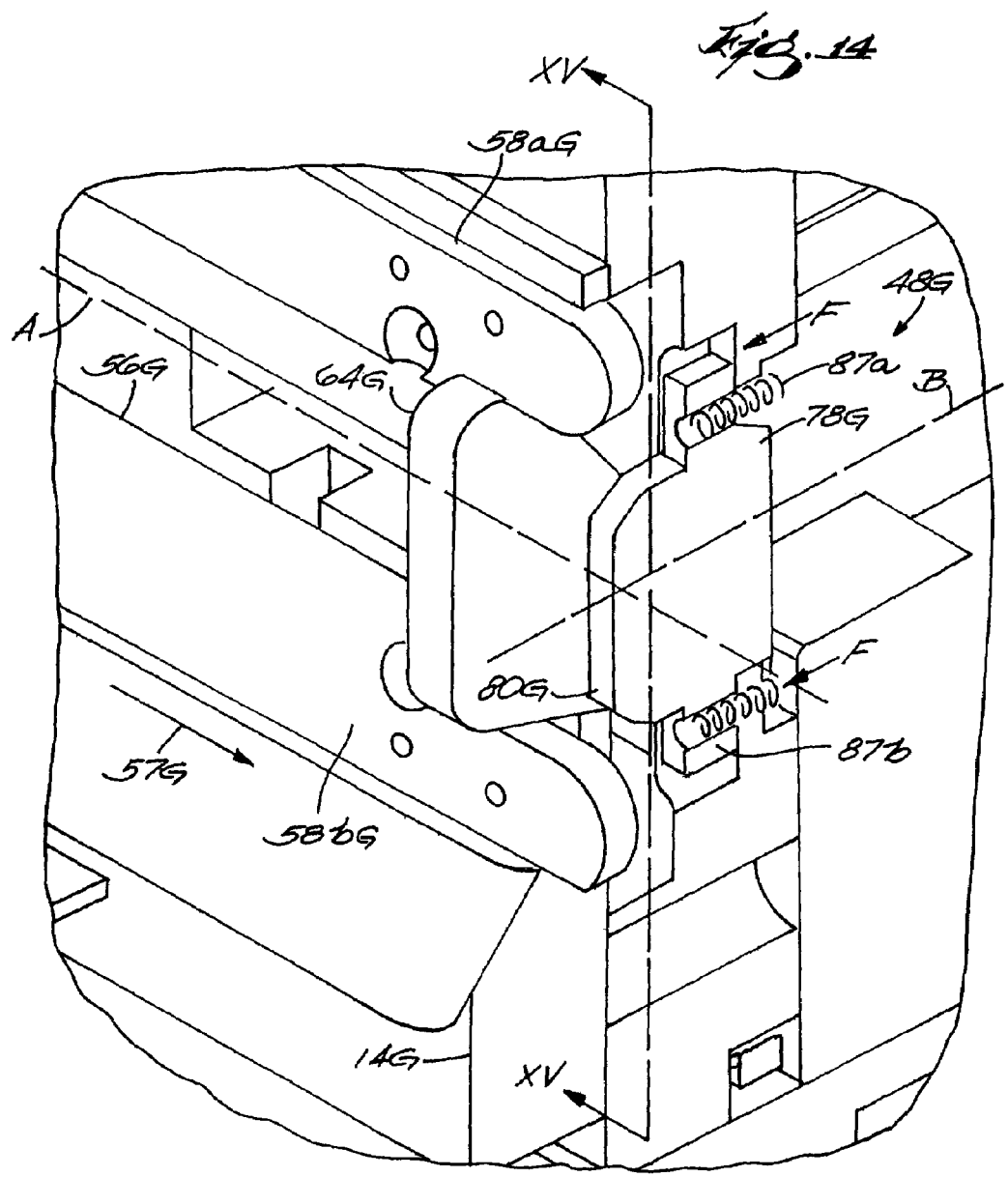
FIG. 14 illustrates a sixth construction of a blade arrangement for a blind trimming apparatus embodying the invention.
Figure 15:
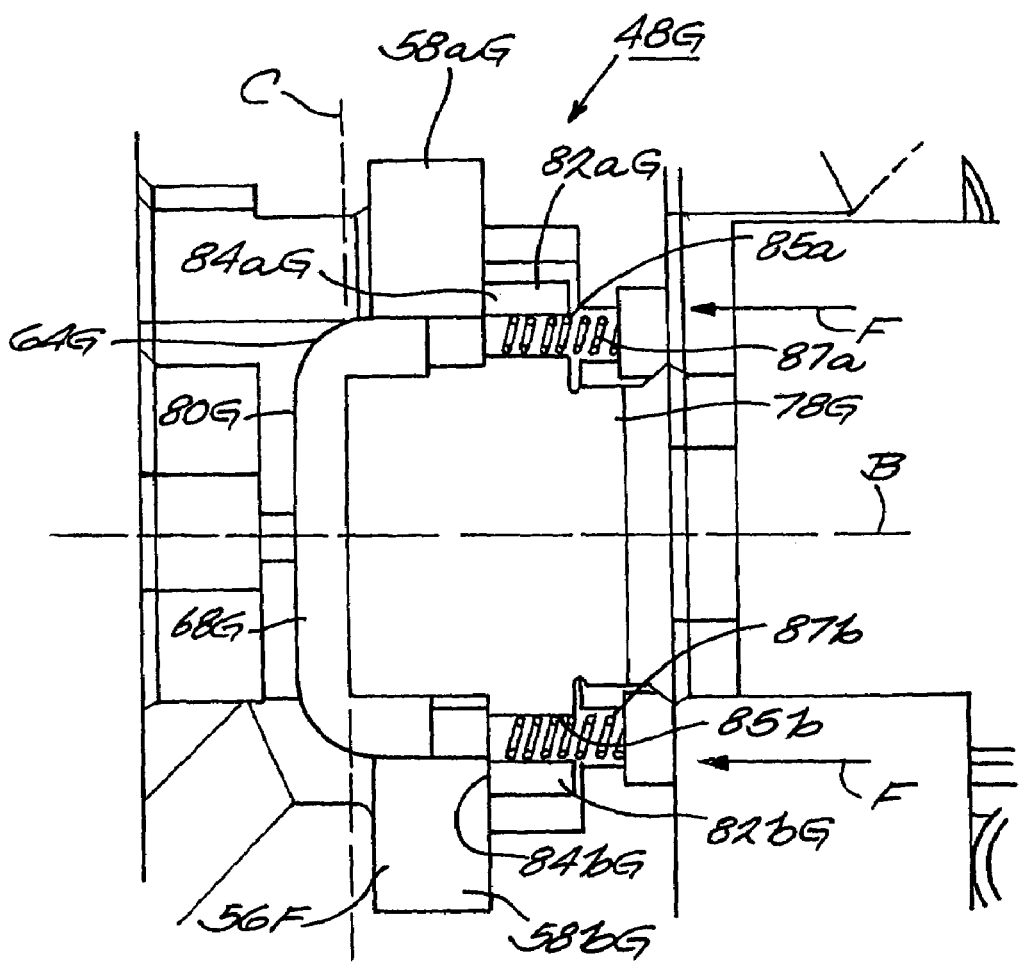
FIG. 15 is a sectional view taken along line XV-XV in FIG. 14.

A sixth construction of a blade arrangement 48G for a blind trimming apparatus 10 is illustrated in FIGS. 14 and 15. Common elements are identified by the same reference number "G".

As shown in FIGS. 14 and 15, a carriage 56G is moveable along a cutting path (represented by arrow 57G) which is substantially parallel to the first axis A. The carriage 56G is preferably coupled to a drive assembly (not shown) which is substantially similar to the above-described drive assemblies. The carriage 56G supports a cutting blade 64G, having outwardly extending flanges (not shown) and a cutting edge 68F extending between the flanges. In some aspects and in the illustrated construction, forwardly extending legs 58*a*F, 58*b*F of the carriage 56F define blade recesses (not shown) and the flanges are positioned in the blade recesses.

The frame 14G supports a cutting tool 78G having a cutting edge 80G and outwardly extending flanges 82*a*G, 82*b*G located on opposite sides of the cutting edge 80G. The flanges 82*a*G, 82*b*G define engagement surfaces 84*a*G, 84*b*G and apertures 85*a*, 85*b*. The flanges 82*a*G, 82*b*G support elastic members (e.g., springs) 87*a*, 87*b* in the apertures 85*a*, 85*b*. The elastic members 85*a*, 85*b* apply a force (represented by arrows F in FIGS. 14 and 15) and bias the cutting tool 78G outwardly from the frame 14G in a direction generally parallel to the second axis B. In other aspects and in other constructions (not shown), the cutting tool 78G can support one, three, or more elastic members 85.

During operation, as the carriage 56G is moved along the cutting path 57G (e.g., by a drive assembly, as described above with respect to the previously described first construction), the cutting edge 68G trims some of slats S of the blinds V. As the carriage 56G continues to move along the cutting path 57G, the final slats S are sheared between the cutting edge 68G of the cutting blade 64G and the cutting edge 80G of the cutting tool 78G. Additionally, the elastic members 87*a*, 87*b* force the cutting tool 78G outwardly in a direction generally parallel to the second axis B and maintain the cutting edge 80G of the cutting tool 78G in shearing engagement with the cutting edge 80G of the cutting blade 64G. In this manner, the elastic members 87*a*, 87*b* maintain a desired distance between the cutting edges 64F and 80F during trimming of the slats S.

Figure 16:
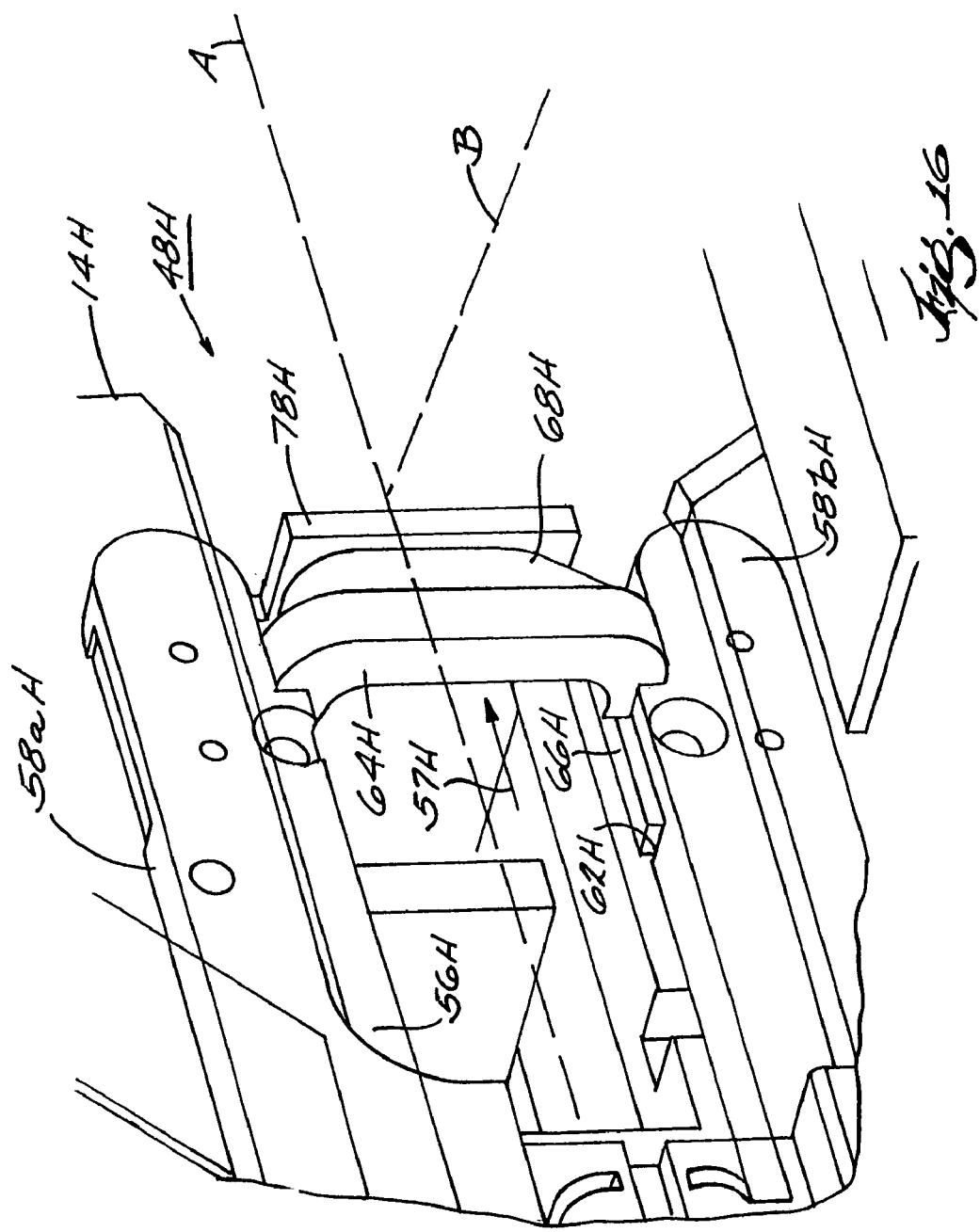
FIG. 16 illustrates a seventh construction of a blade arrangement for a blind trimming apparatus embodying the invention.

A seventh construction of a blade arrangement 48H for a blind trimming apparatus 10 is illustrated in FIG. 16. Common elements are identified by the same reference number "H".

As shown in FIG. 16, a carriage 56H is moveable along a cutting path (represented by arrow 57H) which is substantially parallel to the first axis A. The carriage 56H is preferably coupled to a drive assembly (not shown) which is substantially similar to the above-described drive assemblies. The carriage 56H supports a cutting blade 64H, having flanges 66H (only one is shown in FIG. 16) and a cutting edge 68H extending between the flanges 66H. The cutting blade 64 is made of a first relatively hard material (e.g., machine steel, titanium, stainless steel, 1040 steel, 1060 steel, heat treated materials, alloys, composites, and the like) having a first hardness (e.g., having a Rockwell hardness number of between about 58 and about 62). In some aspects and in the illustrated construction, forwardly extending legs 58*a*H, 58*b*H of the carriage 56H define blade recesses 62H (only one is shown in FIG. 16) and the flanges 66H are positioned in the blade recesses 62H.

The frame 14H supports an anvil or cutting tool 78H made of a second relatively soft material (e.g., plastic, rubber, aluminum, brass, copper, and the like) having a second hardness (e.g., having a Rockwell hardness number between about 15 and about 50). In some aspects and in the illustrated construction, the cutting blade 64H is made of alloy tool steel having a Rockwell hardness number of about 60 and the cutting tool 78H is made of brass or another relatively soft material having a Rockwell hardness number of less than about 50.

During operation, as the carriage 56H is moved along the cutting path 57H (e.g., by a drive assembly, as described above with respect to the previously described first construction), the cutting edge 68H of the cutting tool 64H shears the slats S against the cutting tool 78H. As the cutting tool 68H trims the final slats S, the cutting edge 68H of the cutting tool 64H impacts or dead ends against a front face of the relatively soft cutting tool 78H. Because the hardness of the cutting blade 68H is substantially greater than the hardness of the cutting tool 78H, the cutting edge 68H of the cutting tool 64H remains relatively sharp and is not dulled by repeated impacts with the front face of the cutting tool 78H.

Figure 17:
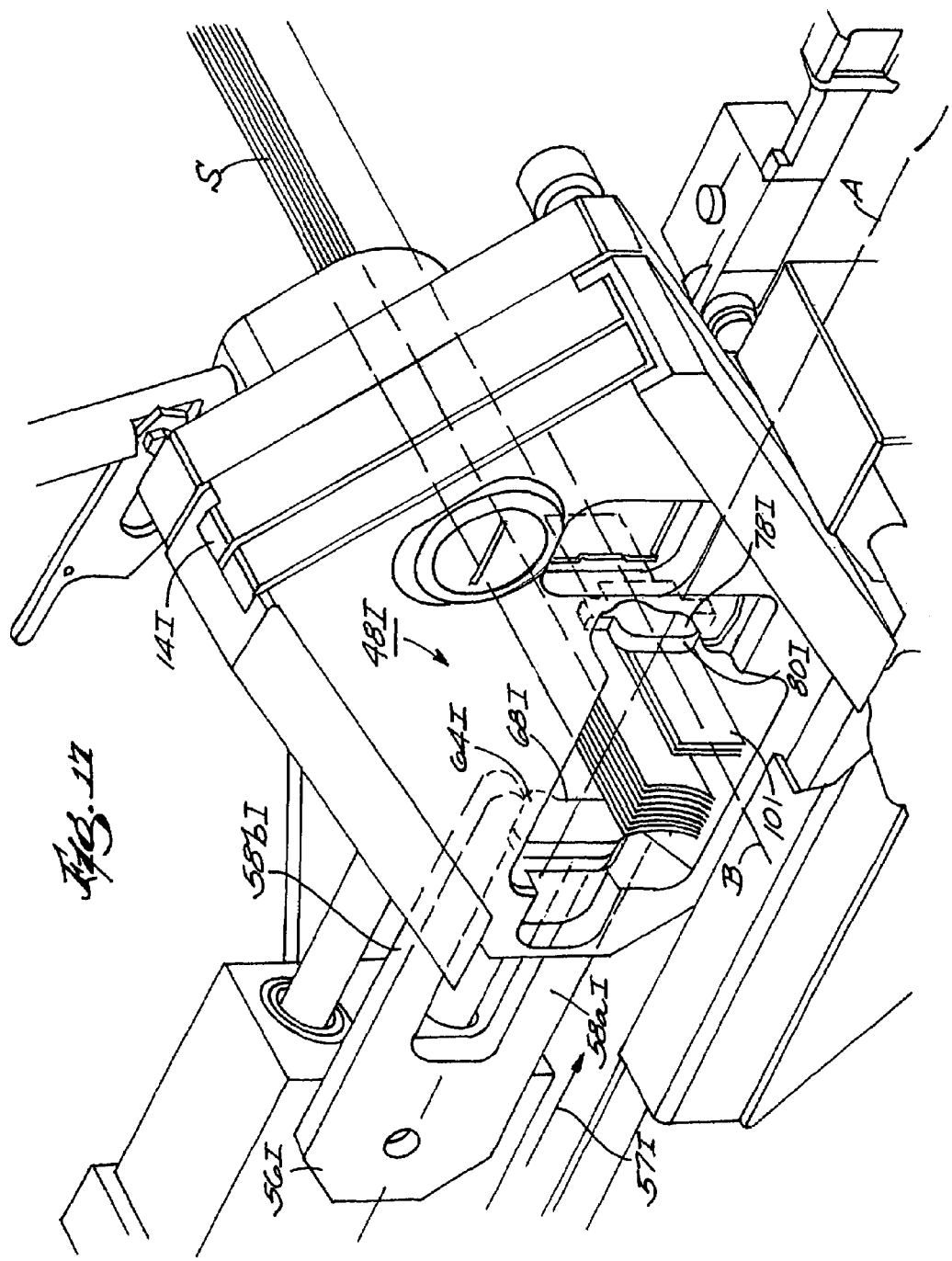
FIG. 17 illustrates an eighth construction of a blade arrangement for a blind trimming apparatus embodying the invention.

An eighth construction of a blade arrangement 48I for a blind trimming apparatus 10 is illustrated in FIG. 17. Common elements are identified by the same reference number "I".

As shown in FIG. 17, a carriage 56I is moveable along a cutting path (represented by arrow 57I) which is substantially parallel to the first axis A. The carriage 56I is preferably coupled to a drive assembly (not shown) which is substantially similar to the above-described drive assemblies. The carriage 56I supports a cutting blade 64I, having flanges (not shown) and a cutting edge 68I extending between the flanges. Forwardly extending legs 58*a*I, 58*b*I of the carriage 56I define blade recesses (not shown) and the flanges are positioned in the blade recesses.

The frame 14I supports a cutting tool 78I having a cutting edge 80I that extends into a blind slat opening 22I along the second axis B. An insert 101 is positioned along the cutting path 57I adjacent to the cutting tool 78I. In some aspects and in the illustrated construction, the insert 101 includes a number of conventional blind slats similar to the blind slats S of the blind V. However, in other aspects and in other constructions (not shown), one or more other inserts can also or alternately be used.

During operation, as the carriage 56I is moved along the cutting path 57I (e.g., by a drive assembly, as described above with respect to the previously described first construction), the cutting edge 68I contacts and trims the slats S of the blinds V. As the carriage 56I continues to move along the cutting path 57I, the insert 101 supports the slats S and prevents the final slats S from bending (e.g., along the first axis A) during trimming.

FIGS. 18-28 illustrate an alternate construction of the blind trimming apparatus 10J according to the present invention. The blind trimming apparatus in FIGS. 18-28 is similar in many ways to the illustrated constructions of FIGS. 1-17 described above. Accordingly, with the exception of mutually inconsistent features and elements between the constructions of FIGS. 18-28 and the constructions of FIGS. 1-17, reference is hereby made to the description above accompanying the constructions of FIGS. 1-17 for a more complete description of the features and elements (and the alternatives to the features and elements) of the construction of FIGS. 18-28. Features and elements in the construction of FIGS. 18-28 corresponding to features and elements in the constructions of FIGS. 1-17 are identified by the same reference number and the letter "J".

Figure 18:
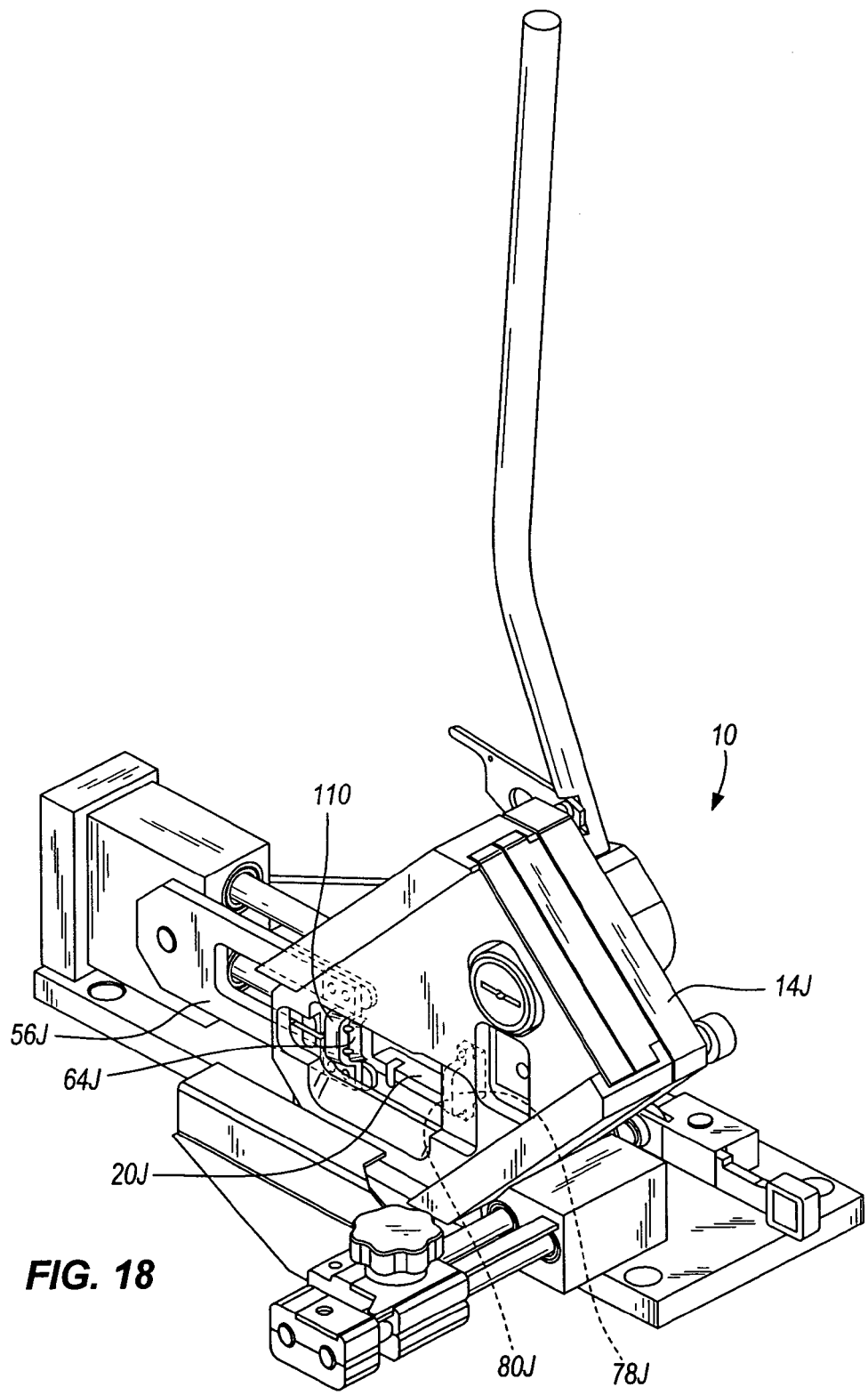
FIG. 18 is a perspective view of a ninth construction of a blind trimming apparatus embodying the invention.
Figure 19:
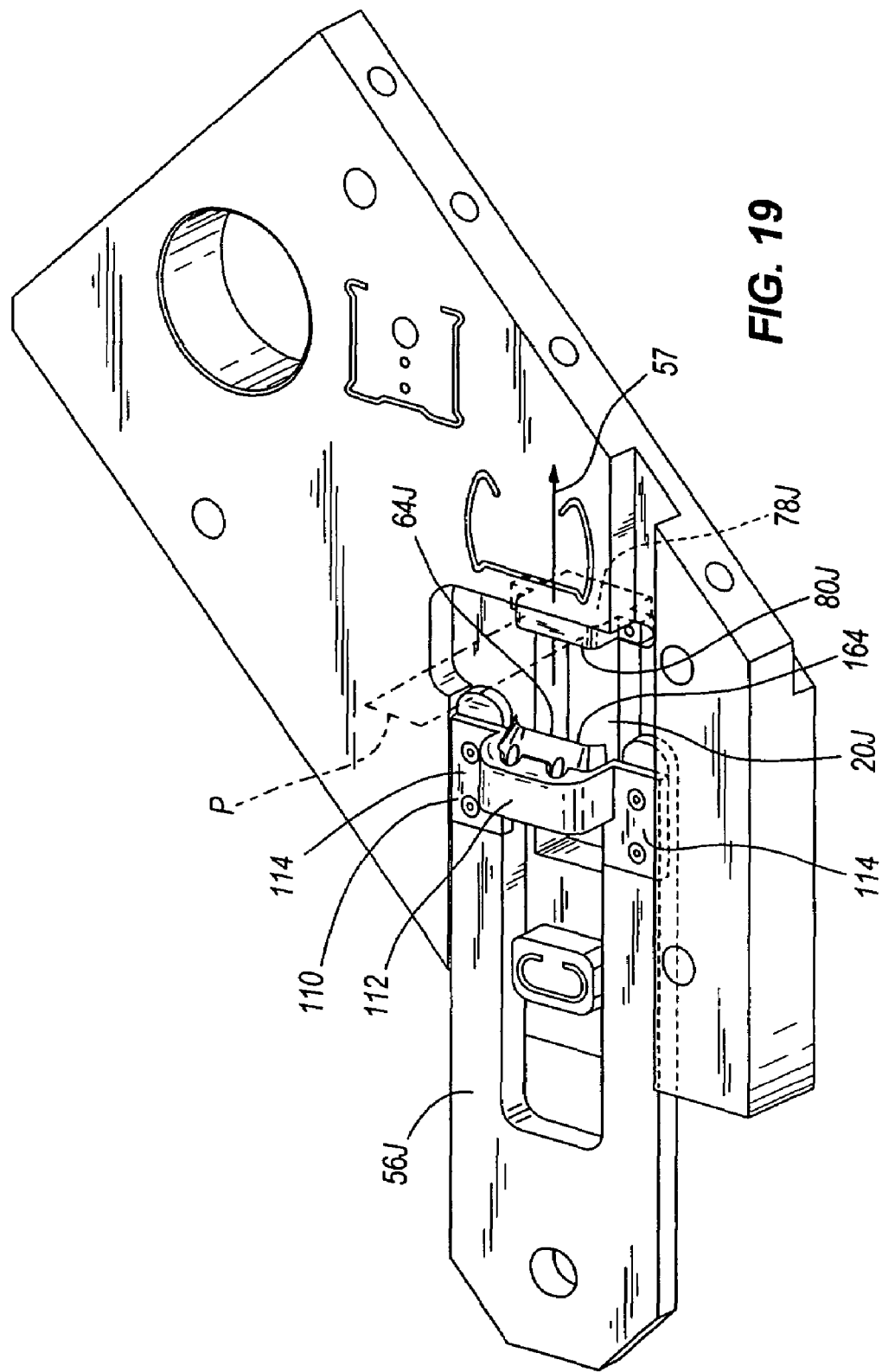
FIG. 19 is an enlarged perspective view of a portion of the blind trimming apparatus shown in FIG. 18.

As shown in FIGS. 18 and 19, the blind trimming apparatus 10J includes a frame 14J, which defines a cutting recess or blind slat opening 20J. The frame 14J also supports a die or cutting tool 78J, which extends outwardly from the frame 14J through at least a portion of the cutting recess 20J.

The cutting tool 78J includes a cutting edge 80J and defines an imaginary plane P, which extends through the cutting recess 20J and the cutting edge 80J. In the illustrated construction of FIGS. 18 and 19, the cutting edge 80J is substantially arcuately shaped. In other constructions, the cutting tool 78J can have other shapes and configurations, such as, for example, a substantially V-shaped cutting edge, a substantially U-shaped cutting edge, a linear cutting edge, and the like.

Figure 20:
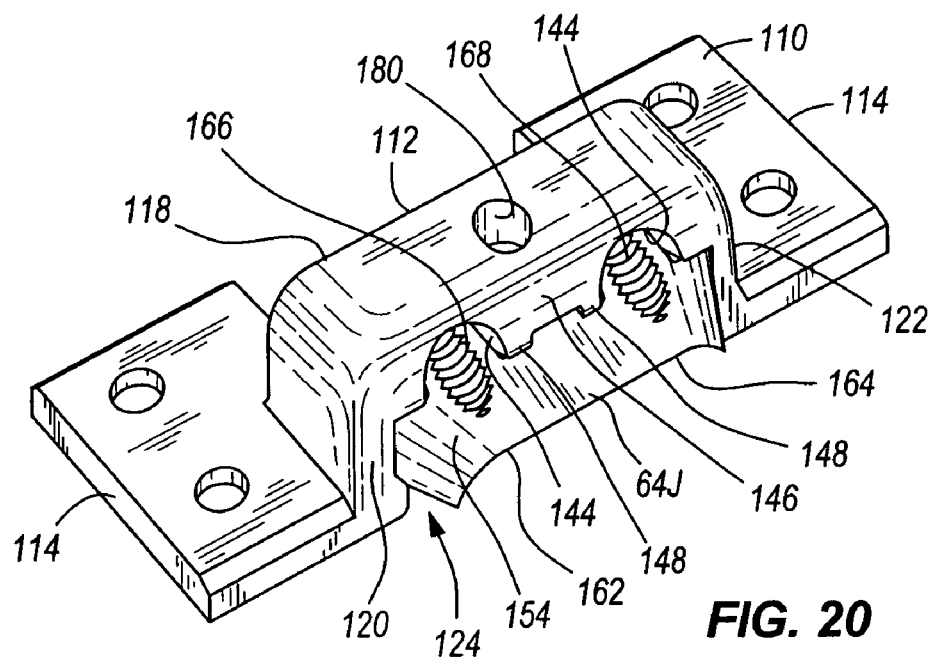
FIG. 20 is an enlarged perspective view of a blade insert and a blade holder of the blind trimming apparatus shown in FIG. 18.
Figure 21:
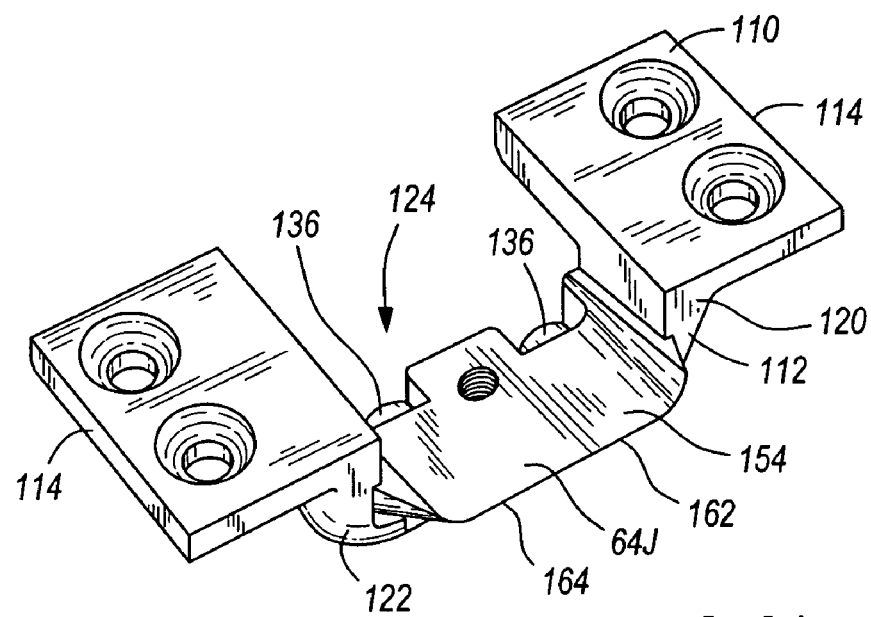
FIG. 21 is a bottom view of the blade insert and the blade holder of the of the blind trimming apparatus shown in FIG. 18.
Figure 22:
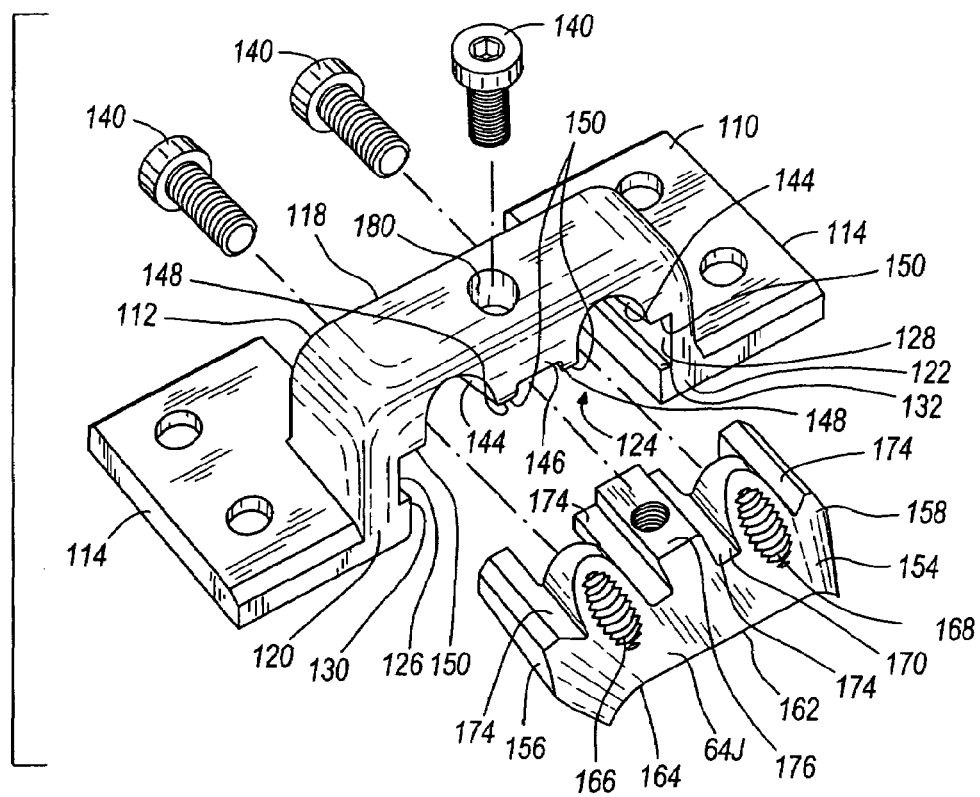
FIG. 22 is an exploded perspective view of the blade insert and the blade holder of the blind trimming apparatus shown in FIG. 18.
Figure 23:
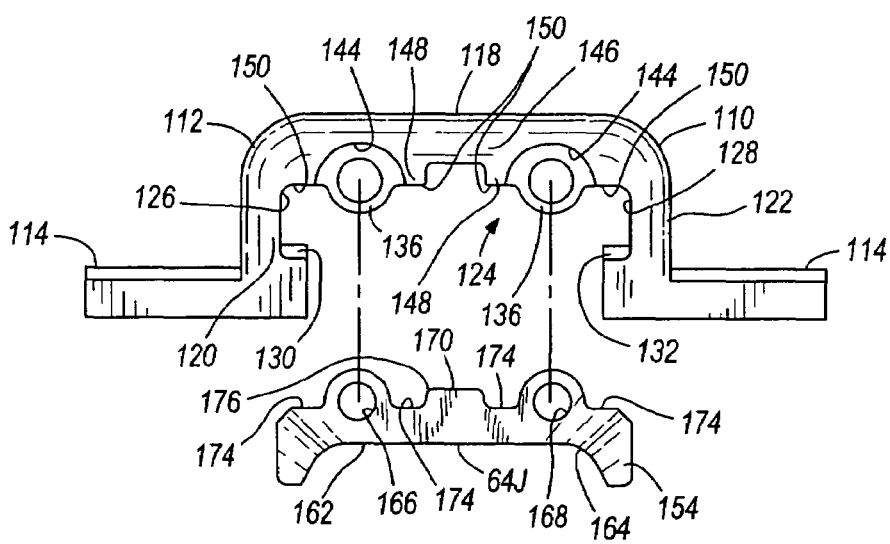
FIG. 23 is a front exploded view of the blade insert and the blade holder of the blind trimming apparatus shown in FIG. 18.
Figure 24:
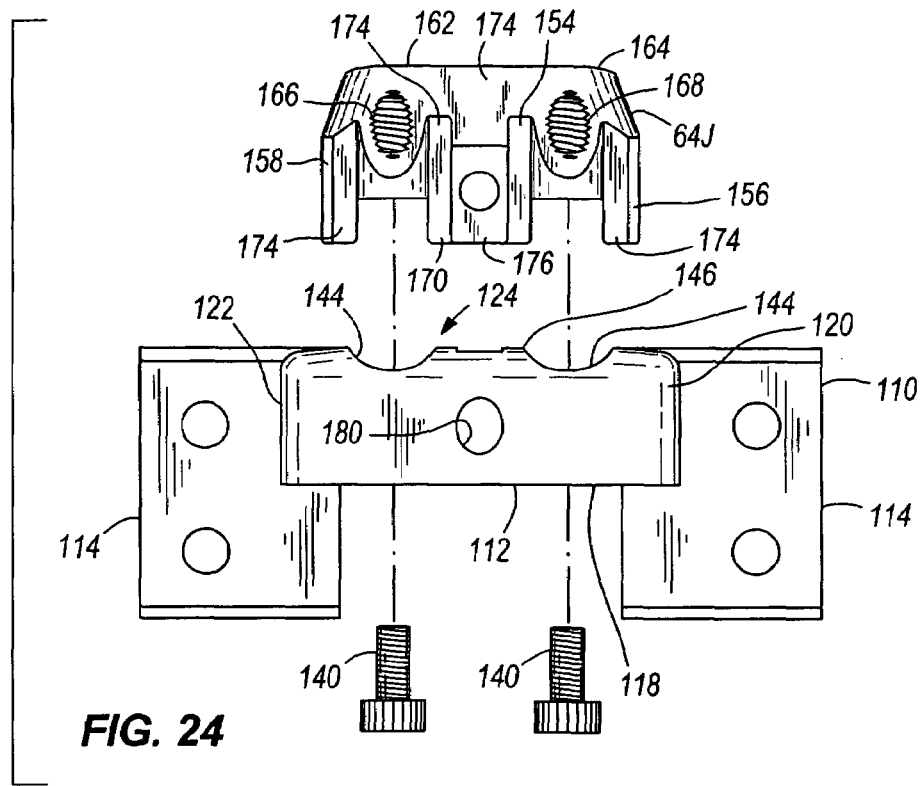
FIG. 24 is a top exploded view of the blade insert and the blade holder of the blind trimming apparatus shown in FIG. 18.
Figure 25:
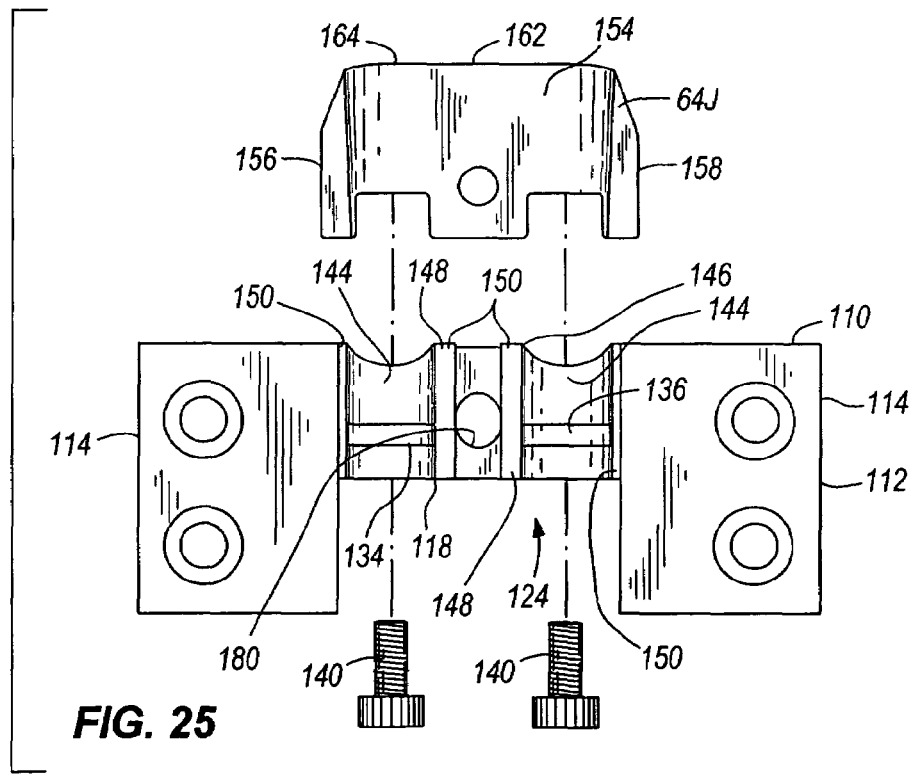
FIG. 25 is a bottom exploded view of the blade insert and the blade holder of the blind trimming apparatus shown in FIG. 18.
Figure 26:
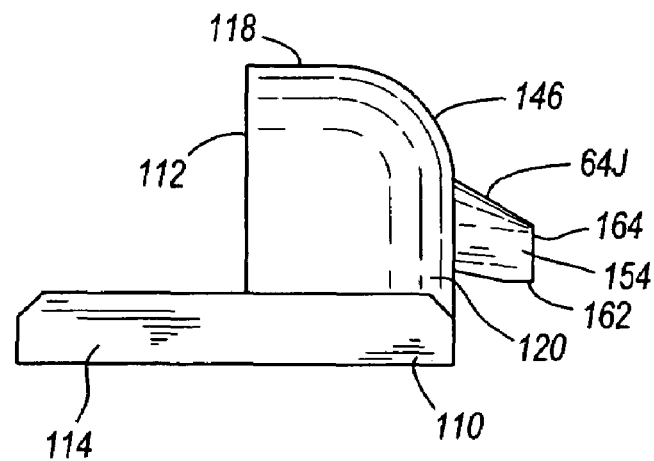
FIG. 26 is a side view of the blade insert and the blade holder of the blind trimming apparatus shown in FIG. 18.
Figure 27:
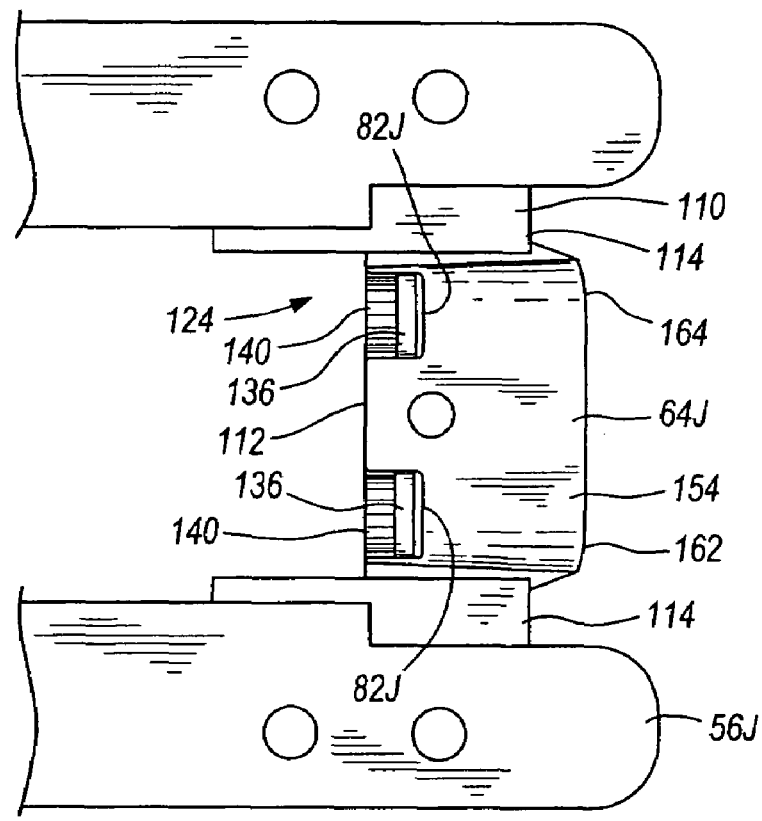
FIG. 27 is a bottom view of a portion of the blind trimming apparatus shown in FIG. 18.
Figure 28:
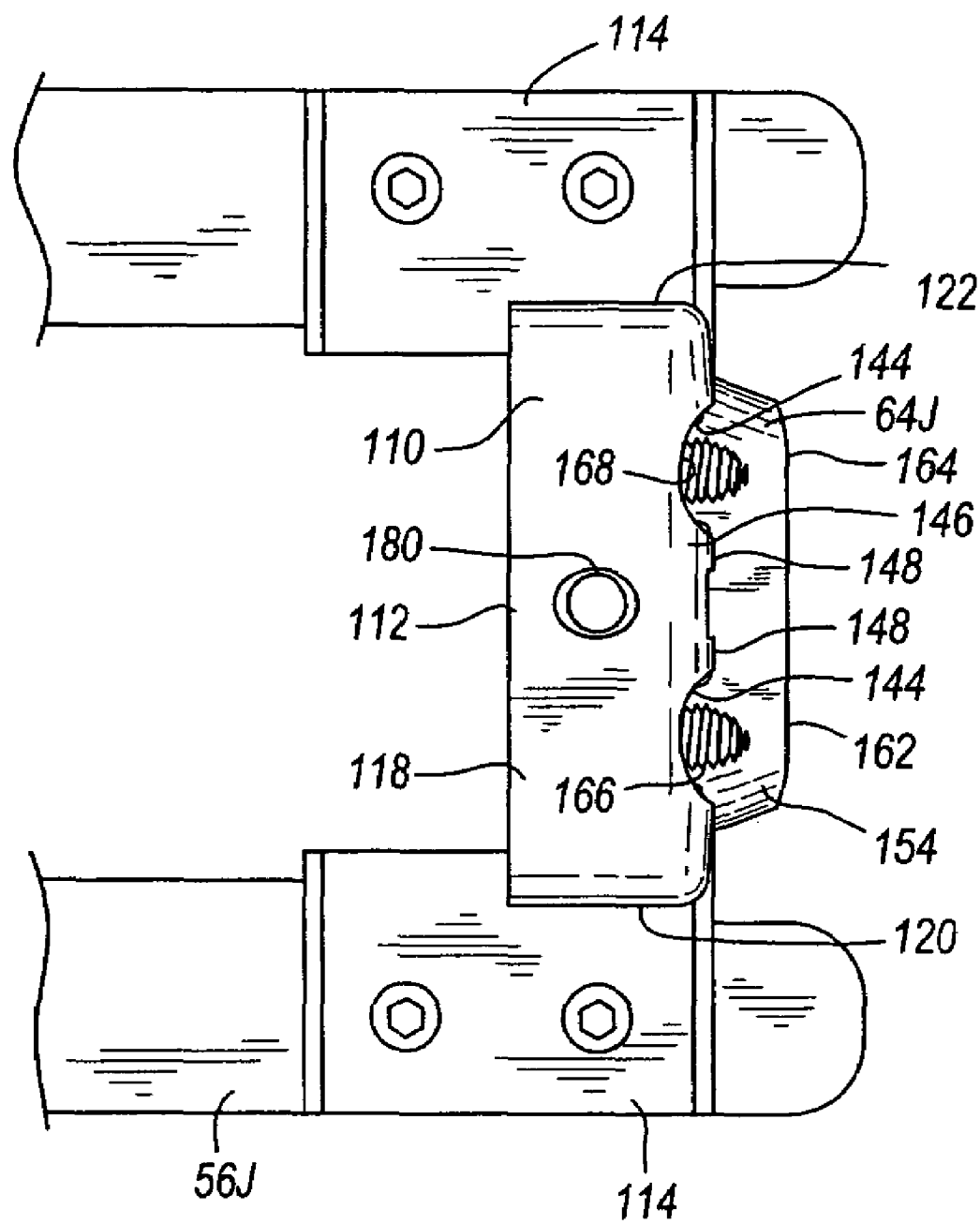
FIG. 28 is a top view of a portion of the blind trimming apparatus shown in FIG. 18.

The frame 14J also supports a carriage 56J for movement relative to the frame 14J along a cutting path (represented by arrow 57J in FIG. 19) between a first or retracted position (shown in FIGS. 19 and 20) and a second or cutting position (not shown). As shown in FIGS. 19 and 20, the cutting path 57J is substantially linear and is substantially perpendicular to the imaginary plane P defined by the cutting tool 78J.

The carriage 56J supports a blade holder 110 for movement with the carriage 56J along the cutting path 57J. In the illustrated construction of FIGS. 18 and 28, the blade holder 110 includes a body portion 112 and outwardly extending flanges 114. The body portion 112 includes an upper wall 118 and side walls 120, 122 extending outwardly from the upper wall 118. Together, the upper wall 118 and side walls 120, 122 at least partially define an attachment portion 124.

In some constructions, the side walls 120, 122 define locating recesses 126, 128, respectively. In the illustrated construction of FIGS. 22 and 23, the side walls 120, 122 include inclined surfaces or ramps 130, 132, which at least partially define the locating recesses 126, 128. In some constructions, the ramps 130, 132 are inclined between about 1 degree and about 25 degrees with respect to the cutting path 57J. In other constructions, ramps 130, 132 being inclined between about 9 degrees and about 11 degrees with respect to the cutting path 57J have achieved desirable results.

Tabs 136 extend outwardly from the upper wall 118 of the blade holder 110 between the side walls 120, 122. The upper wall 118 also defines arcuately shaped recesses 144, which extend through a forward end 146 of the blade holder 110. As explained in greater detail below, fasteners 140 extend through the arcuately shaped recesses 144 and secure blade inserts 64J to the cutting tabs 120, 122. Rails 148 extend along the upper wall 118 on opposite sides of the arcuately shaped recesses 114 and define engagement surfaces 150.

In the illustrated construction of FIGS. 18-28, the blade insert 64J includes a body 154 having outwardly extending location protrusions 156, 158. In some constructions, portions of the locating protrusions 156, 158 are inclined between about 1 degree and about 25 degrees with respect to the cutting path 57J. In other constructions, locating protrusions 156, 158 being inclined between about 9 degrees and about 11 degrees with respect to the cutting path 57J have achieved desirable results.

As explained in greater detail below, the locating protrusions 156, 158 are engageable in the locating recesses 126, 128 of the blade holder 110 to secure the blade insert 64J to the attachment portion 124 of the blade holder 110 and to orient the blade insert 64J with respect to the blade holder 110 and, consequently, to orient the blade insert 64J with respect to the cutting tool 78J. In some constructions, such as, for example, the illustrated construction of FIGS. 18-28, the locating protrusions 156, 158 and the locating recesses 126, 128 have complementary shapes.

A forward end 162 of the blade insert 64J includes a cutting edge 164 and defines fastener openings 166, 168. An upper portion 170 of the blade insert 64J includes engagement surfaces 174 located adjacent to the fastener openings 164, 166. In the illustrated construction of FIGS. 22-24, the upper portion 170 of the blade insert 64J also includes a locating protrusion 176.

To assembly the blind trimming apparatus 10, an operator secures the cutting tool 78J and the carriage 56J to the frame 14J. The operator then secures the blade holder 110 to the carriage 56J for movement with the carriage 56J along the cutting path 57J. In some constructions, the operator may use shims or other locating tools to orient the blade holder 110 with respect to the frame 14J and/or the cutting tool 78J. In still other constructions, the operator may use shims and/or other locating tools to orient the blade holder 110 with respect to the carriage 56J. In some such constructions, the operator orients the blade holder 110 to ensure that blade inserts 64J supported in the blade holder 110 have a desired orientation with respect to the cutting tool 78J and with respect to the frame 14J, as explained in greater detail below. Accordingly, in some such constructions, the operator orients the blade holder 110 so that the attachment portion 124 or a portion of the attachment portion 124 is spaced a predetermined distance from the cutting tool 78J and/or the frame 14J.

After securing the blade holder 110 to the carriage 56J, the operator positions a blade insert 64J adjacent to the attachment portion 124 of the blade holder 110 and aligns the locating protrusions 156, 158 with the locating recesses 126, 128 of the blade holder 110. In constructions, such as the illustrated construction of FIGS. 22-24, having a locating protrusion 176 on the upper portion 170 of the blade insert 64J, the operator also aligns the locating protrusion 176 of the blade insert with the rails 148 of the blade holder 146. The operator then moves the locating protrusions 156, 158 along the ramps 130, 132 to orient the blade insert 64J with respect to the blade holder 110. More specifically, as the operator moves the locating protrusions 156, 158 along the ramps 130, 132, the ramps 130, 132 force the blade insert 64J upwardly and rearwardly into a desired position in the attachment portion 124.

When the blade insert 64J is in the desired position in the attachment portion 124, the blade insert 64J is spaced a predetermined distance from the cutting tool 78J and is oriented in a desired orientation with respect to the cutting tool 78J. In the illustrated construction, when the blade insert 64J is in the desired position in the attachment portion 124, cutting edge 164 of the blade insert 64J is spaced a predetermined distance, such as, for example between about 0.000 inches and about 0.001 inches from the cutting edge 80J of the cutting tool 78J measured along the imaginary plane P. In other constructions, the blade insert 64J have different predetermined orientations with respect to the cutting tool 78J and/or the frame 14.

In the illustrated construction of FIGS. 18-28, when the blade insert 64J is in the desired position, the engagement surfaces 174 of the blade insert 64J engage the engagement surfaces 150 of the blade holder 110 to prevent relative movement between the blade insert 64J and the blade holder 110. Alternatively or in addition, the engagement between the locating protrusions 156, 158 and the ramps 130, 132, and in some cases, between the locating protrusion 176 and the rails 148, holds the blade insert 64J in the attachment portion 124 of the blade holder 124. Specifically, in such constructions, the locating protrusions 156, 158 lockingly engage the ramps 130, 132 and the locating protrusion 176 lockingly engages the rails 148, preventing movement of the blade insert 64J with respect to the blade holder 110.

After positioning the blade insert 64J in the attachment portion 124, the operator can insert fasteners 140 through the fastener openings 166, 168 in the blade insert 64J and through the tabs 136 in the blade holder 110 to secure the blade insert 64J to the blade holder 110. In some constructions, such as the illustrated construction of FIGS. 18-28, the operator can also insert a fastener 140 through an aperture 180 extending through the upper portion 170 of the blade holder 110 to further secure the blade insert 64J to the blade holder 110 and to further prevent relative movement between the blade insert 64J and the blade holder 110.

In some constructions, such as the illustrated construction of FIGS. 18-28, the locating protrusions 156 of the blade insert 64J and/or the ramps 130, 132 of the blade holder 110 can be oriented to prevent the rearward end 162 of the blade insert 64J from contacting the tabs 136 of the blade holder 110. In these constructions, the rearward end 162 of the blade insert 64J and the tabs 136 define a space 82J. In these constructions, the space 82J prevents the operator from over-tightening the blade insert 64J and from damaging the blade insert 64J and/or the blade holder 110. Specifically, when the blade insert 64J is secured to the blade holder 110 and the locating protrusions 156 engage the ramps 130, 132, the space 82J limits the degree of interference between the blade holder 110 and the blade insert 64J, preventing over-tightening of the blade insert 64J into the blade holder 110 while enabling a zero clearance fit condition and/or a predetermined interference between the blade holder 110 and the blade insert 64J.

After the blind trimming apparatus 10J is assembled, the operator can operate the blind trimming apparatus 10J as described above with respect to other constructions of the present invention to trim blinds V and/or portions of blinds V. During such trimming operations, the blade insert 64J can become worn and the cutting edge 164 of the blade insert 64J can become damaged. Accordingly, an operator can replace the blade insert 64J by removing the fasteners 140 and sliding the blade insert 64J out of the attachment portion 124. The operator can then insert a second blade insert 64J into the attachment portion 124 of the blade holder 110 as described above. The engagement between the locating protrusions 156, 158 of the second blade insert 64J and the locating recesses 126, 128 of the blade holder 110, and in some constructions, between the locating protrusion 176 and the rails 148, align the second blade insert 64J with respect to the cutting tool 78J so that the cutting edge 164J of the second blade insert 64J is spaced the predetermined distance from the cutting edge 80J of the cutting tool 78J measured along the imaginary plane P. In this manner, the operator can replace damaged or worn blade inserts 64J without shims or other locating tools.

The constructions and aspects described above and illustrated in the drawings are presented by way of example only and are not intended as a limitation upon the concepts and principles of the present invention. As such, it will be appreciated by one having ordinary skill in the art, that various changes in the elements and their configuration and arrangement are possible without departing from the spirit and scope of the present invention as set forth in the appended claims.

What is claimed is:

1. A blind trimming apparatus comprising:
    a frame supporting a cutting tool, the cutting tool including a cutting edge;
    a blade holder guided on the frame for movement with respect to the cutting tool along a cutting path;
    a blade insert including a cutting edge and being connectable to the blade holder for movement with the blade holder with respect to the cutting tool to trim blinds between the cutting edge of the cutting tool and the cutting edge of the blade insert;
    one of the blade holder and the blade insert including a ramp at least partially defining a locating recess;
    an other of the blade holder and the blade insert having a locating protrusion, the locating protrusion being engageable in the locating recess to align the blade insert with respect to the blade holder so that, during cutting, the cutting edge of the blade insert is spaced a predetermined distance from the cutting edge of the cutting tool measured along a plane, the plane being substantially perpendicular to the cutting path and extending through the cutting tool; and
    at least a portion of at least one of the ramp and the locating protrusion being angled with respect to the cutting path between about 5 degrees and about 25 degrees with respect to the cutting path.

2. The blind trimming apparatus of claim 1, and further comprising a fastener for securing the blade insert to the blade holder.

3. The blind trimming apparatus of claim 1, wherein the blade insert includes a forward end and a rearward end, the forward end including the cutting edge, and wherein, when the blade insert is connected to the blade holder, at least a portion of the rearward end of the blade insert and the blade holder define a space therebetween.

4. The blind trimming apparatus of claim 3, and further comprising a threaded fastener removeably connecting the blade insert and the blade holder and extending across the space, and wherein, when the blade insert is secured to the blade holder, the space limits the degree of interference between the blade insert and the blade holder.

5. The blind trimming apparatus of claim 1, wherein the ramp is angled with respect to the cutting path between about 5 degrees and about 25 degrees with respect to the cutting path.

6. The blind trimming apparatus of claim 5, wherein the ramp is angled with respect to the cutting path between about 9 degrees and about 11 degrees with respect to the cutting path.

7. The blind trimming apparatus of claim 1, wherein at least a portion of the locating protrusion is angled between about 5 degrees and about 25 degrees with respect to the cutting path.

8. The blind trimming apparatus of claim 7, wherein the portion of the locating protrusion is angled between about 9 degrees and about 11 degrees with respect to the cutting path.

9. The blind trimming apparatus of claim 1, wherein the one of the blade holder and the blade insert defines a second locating recess and the other of the blade holder and the blade insert includes a second locating protrusion, the second locating protrusion being engageable in the second locating recess to align the blade insert with respect to the blade holder.

10. The blind trimming apparatus of claim 1, wherein the predetermined distance is between about 0.000 inches and about 0.001 inches.

11. The blind trimming apparatus of claim 1, wherein the locating recess has a complementary shape to the locating protrusion.

12. The blind trimming apparatus of claim 1, wherein the one of the blade holder and the blade insert includes a second locating protrusion and the other of the blade holder and the blade insert defines a second locating recess, the second locating protrusion being engageable in the second locating recess to align the blade insert with respect to the blade holder.

13. The blind trimming apparatus of claim 1, wherein the blade holder includes an attachment portion, wherein the blade insert is connectable to the attachment portion of the blade holder, and wherein, the blade holder is positioned with respect to the frame so that, during cutting, at least a portion of the attachment portion is spaced a second predetermined distance from the cutting edge of the cutting tool measured along the plane.

14. A blind trimming apparatus comprising:
    a frame supporting a cutting tool, the cutting tool including a cutting edge;
    a blade holder guided on the frame for movement with respect to the cutting tool along a cutting path;
    a blade insert including a cutting edge and being connectable to the blade holder for movement with the blade holder with respect to the cutting tool to trim blinds between the cutting edge of the cutting tool and the cutting edge of the blade insert;
    one of the blade holder and the blade insert including a locating protrusion, at least a portion of the locating protrusion being angled with respect to the cutting path; and
    an other of the blade holder and the blade insert including a ramp at least partially defining a locating recess, the locating protrusion being engageable in the locating recess to align the blade insert with respect to the blade holder; and
    at least a portion of one of the locating protrusion and the ramp being angled between about 5 degrees and about 25 degrees with respect to the cutting path.

15. The blind trimming apparatus of claim 14, wherein the locating protrusion is engageable in the locating recess to orient the blade insert with respect to the blade holder so that, during cutting, the cutting edge of the blade insert is spaced a predetermined distance from the cutting edge of the cutting tool measured along a plane extending through the cutting tool and being substantially perpendicular to the cutting path.

16. The blind trimming apparatus of claim 14, wherein the predetermined distance is between about 0.000 inches and about 0.001 inches.

17. The blind trimming apparatus of claim 14, and further comprising a fastener for securing the blade insert in the blade holder.

18. The blind trimming apparatus of claim 14, wherein the blade insert includes a forward end and a rearward end, the forward end including the cutting edge, and wherein, when the blade insert is connected to the blade holder, at least a portion of the rearward end of the blade insert and the blade holder define a space therebetween.

19. The blind trimming apparatus of claim 18, and further comprising a threaded fastener removeably connecting the rearward end of the blade insert and the blade holder and extending across the space, and wherein, when the blade insert is secured to the blade holder, the space limits the degree of interference between the blade insert and the blade holder.

20. The blind trimming apparatus of claim 14, wherein at least a portion of the ramp is angled between about 5 degrees and about 25 degrees with respect to the cutting path.

21. The blind trimming apparatus of claim 20, wherein the ramp is angled with respect to the cutting path between about 9 degrees and about 11 degrees with respect to the cutting path.

22. The blind trimming apparatus of claim 14, wherein at least a portion of the locating protrusion is angled between about 5 degrees and about 25 degrees with respect to the cutting path.

23. The blind trimming apparatus of claim 22, wherein at least a portion of the locating protrusion is angled between about 9 degrees and about 11 degrees with respect to the cutting path.

24. The blind trimming apparatus of claim 14, wherein the one of the blade holder and the blade insert defines a second locating recess and the other of the blade holder and the blade insert includes a second locating protrusion, the second locating protrusion being engageable in the second locating recess to align the blade insert with respect to the blade holder.

25. The blind trimming apparatus of claim 14, wherein the locating recess has a complementary shape to the locating protrusion.

26. The blind trimming apparatus of claim 14, wherein the one of the blade holder and the blade insert defines a second locating recess and the other of the blade holder and the blade insert includes a second locating protrusion, the second locating protrusion being engageable in the second locating recess to align the blade insert with respect to the blade holder.

27. The blind trimming apparatus of claim 14, wherein the blade holder includes an attachment portion, wherein the blade insert is connectable to the attachment portion of the blade holder, and wherein, the blade holder is positioned with respect to the frame so that, during cutting, at least a portion of the attachment portion is spaced a predetermined distance from the cutting edge of the cutting tool measured along a plane, the plane being substantially perpendicular to the cutting path and extending through the cutting tool.

* * * * *